United States Patent
Montes De Oca Balderas et al.

(10) Patent No.: US 10,875,224 B2
(45) Date of Patent: Dec. 29, 2020

(54) METHOD AND APPARATUS FOR MOLDING AN ELONGATED HOLLOW ARTICLE

(71) Applicant: Hollister Incorporated, Libertyville, IL (US)

(72) Inventors: Horacio Montes De Oca Balderas, Ballina (IE); Herbert Eichler, Spielberg (AT); Gottfried Steiner, Spielberg (AT); Daniel A. March, Lake Villa, IL (US); Gilberto Marchetti, Mundelein, IL (US)

(73) Assignee: Hollister Incorporated, Libertyville, IL (US)

( * ) Notice: Subject to any disclaimer, the term of this patent is extended or adjusted under 35 U.S.C. 154(b) by 188 days.

(21) Appl. No.: 15/751,363

(22) PCT Filed: Aug. 10, 2016

(86) PCT No.: PCT/US2016/046387
§ 371 (c)(1),
(2) Date: Feb. 8, 2018

(87) PCT Pub. No.: WO2017/039992
PCT Pub. Date: Mar. 9, 2017

(65) Prior Publication Data
US 2018/0229412 A1 Aug. 16, 2018

Related U.S. Application Data

(60) Provisional application No. 62/211,290, filed on Aug. 28, 2015.

(51) Int. Cl.
*B29C 45/17* (2006.01)
*B29C 45/26* (2006.01)
(Continued)

(52) U.S. Cl.
CPC ...... *B29C 45/1705* (2013.01); *B29C 45/1703* (2013.01); *B29C 45/261* (2013.01);
(Continued)

(58) Field of Classification Search
CPC .. B29C 45/1705; B29C 45/1706; B29C 45/56
See application file for complete search history.

(56) References Cited

U.S. PATENT DOCUMENTS 2,443,053 A 6/1948 Parmelee
2,801,444 A 8/1957 Zareh
(Continued)

FOREIGN PATENT DOCUMENTS

DE 1111810 7/1961
DE 3905552 8/1990
(Continued)

OTHER PUBLICATIONS

Ahmed, N. et al., A Hydrophilic Technology for Intermittent Urinary Catheters, Medical Device Technology, 19 (1), pp. 17-19 (2008).
(Continued)

*Primary Examiner* — Jacob T Minskey
*Assistant Examiner* — Jennifer A Kessie
(74) *Attorney, Agent, or Firm* — Cook Alex Ltd.

(57) ABSTRACT

A molding apparatus includes a mold comprising a stationary outer mold with a substantially tubular mold cavity, a moveable end mold with an end mold cavity alignable with the tubular mold cavity, and a stationary elongated mold core with a fluid channel therethrough, the mold core extending through the tubular cavity into the end mold cavity. A method of using the apparatus includes injecting a molding material at a material flow rate into the mold, moving the end mold at a speed in a linear direction from a first position to a second position, supplying a fluid at a fluid
(Continued)

flow rate to the fluid channel, and varying at least one of the material flow rate, the end mold speed and the fluid flow rate as the end mold moves from the first position to the second position.

9 Claims, 10 Drawing Sheets

(51) Int. Cl.
B29C 45/56 (2006.01)
B29L 23/00 (2006.01)
B29L 31/00 (2006.01)

(52) U.S. Cl.
CPC ...... B29C 45/56 (2013.01); B29C 2045/5695 (2013.01); B29L 2023/00 (2013.01); B29L 2031/7542 (2013.01)

(56) References Cited

U.S. PATENT DOCUMENTS

| | | | |
|---|---|---|---|
| 2,969,563 | A | 1/1961 | Hendry |
| 3,296,345 | A | 1/1967 | Dietz |
| 3,328,498 | A | 6/1967 | Cheney |
| 3,329,996 | A | 7/1967 | Marcus |
| 3,394,209 | A | 7/1968 | Cheney |
| 3,466,701 | A | 9/1969 | Cheney |
| 3,725,522 | A | 4/1973 | Sheridan et al. |
| 4,188,179 | A | 2/1980 | Linss |
| 4,750,877 | A | 6/1988 | McFarlane |
| 4,806,093 | A | 2/1989 | Linss |
| 5,316,706 | A | 5/1994 | Muni et al. |
| 5,358,580 | A | 10/1994 | Miyamura et al. |
| 5,409,644 | A | 4/1995 | Martin et al. |
| 5,547,364 | A | 8/1996 | Wong et al. |
| 5,558,737 | A | 9/1996 | Brown et al. |
| 5,614,136 | A | 3/1997 | Pepin et al. |
| 5,762,631 | A | 6/1998 | Klein |
| 5,780,073 | A | 7/1998 | Chen et al. |
| 5,851,464 | A | 12/1998 | Davila et al. |
| 5,853,518 | A | 12/1998 | Utas |
| 6,086,970 | A | 7/2000 | Ren |
| 6,280,788 | B1 | 8/2001 | Rakhorst et al. |
| 7,399,444 | B2 | 7/2008 | Skinner et al. |
| 7,431,876 | B2 | 10/2008 | Mejlhede et al. |
| 7,871,261 | B2 | 1/2011 | Steiner et al. |
| 7,910,044 | B2 | 3/2011 | Steiner et al. |
| 8,048,058 | B2 | 11/2011 | Fulford |
| 8,123,892 | B2 | 2/2012 | Morris et al. |
| 10,010,697 | B2 | 7/2018 | Triel et al. |
| 2002/0084551 | A1 | 7/2002 | Lee |
| 2003/0044484 | A1 | 3/2003 | Goral et al. |
| 2004/0159966 | A1 | 8/2004 | Yamaguchi |
| 2004/0241364 | A1 | 12/2004 | Zihlmann |
| 2005/0104255 | A1 | 5/2005 | Mejlhede et al. |
| 2008/0027414 | A1 | 1/2008 | Tanghoj et al. |
| 2010/0221500 | A1 | 9/2010 | Steiner et al. |
| 2011/0180969 | A1 | 7/2011 | Sansoucy |
| 2012/0150130 | A1 | 6/2012 | Triel et al. |
| 2014/0077406 | A1* | 3/2014 | Okamoto ............ B29C 44/086 264/50 |

FOREIGN PATENT DOCUMENTS

| | | |
|---|---|---|
| DE | 202008014672 | 2/2009 |
| DE | 102008052950 | 4/2009 |
| DE | 102008052951 | 4/2009 |
| EP | 0371497 | 6/1990 |
| EP | 0465660 | 1/1992 |
| EP | 0489335 | 6/1992 |
| EP | 0618059 | 10/1994 |
| EP | 0662385 | 7/1995 |
| EP | 0824930 | 2/1998 |
| EP | 0850655 | 7/1998 |
| EP | 1034811 | 9/2000 |
| EP | 1110711 | 6/2001 |
| EP | 1208955 | 5/2002 |
| EP | 1935614 | 6/2008 |
| EP | 2335767 | 6/2011 |
| EP | 2445565 | 5/2012 |
| EP | 2712721 | 4/2014 |
| GB | 2230702 | 10/1990 |
| WO | WO 91/14473 | 10/1991 |
| WO | WO 97/10940 | 3/1997 |
| WO | WO2004/067076 | 8/2004 |
| WO | WO2009/048423 | 4/2009 |
| WO | WO2009/117270 | 9/2009 |
| WO | WO2010/149175 | 12/2010 |
| WO | WO2013/127718 | 9/2013 |
| WO | WO2013/127725 | 9/2013 |
| WO | WO 2014/052770 | 4/2014 |

OTHER PUBLICATIONS

Bales, S. J., Know Your Mold Coatings, Plastics Technology, 50 (12), pp. 52-57 (2004).
Baumeister, C., et al., Excellent Catheter Coupling. Raumedic Develops and Produces a Component of 2K Injection Moldings for Medicinal Applications, Kunststoffberater, 50 (5), pp. 38-40 (2005).
Beddus, D., Extruder Theory and Die Design for Medical Tubing, Conference Medical Manufacturing, Paper 2.2.1 (1990).
Berg, G. et al., Chrome Nitride Coatings for Applications in Plastics Processing, International Polymer Processing, 14 (2), pp. 122-127 (1999).
Brown, S. et al., Extrusion of Precision Small-Diameter Plastic Tubing for Medical Applications, *Medical Device Technology*, 3 (7), pp. 34-40 (1992).
Callari, J., Dies Easy to Adjust, *Plastics World*, 53 (2), p. 14 (1995).
Callari, J. J., Precision Processing: It's All in the Details, Plastics World, 53 (2), pp. 35-38 (1995).
Chen, S. C. et al., Efficiencies of Various Mold Surface Temperature Controls and Their Effects on the Qualities of Injection Molded Parts, Antec 2006, 64th SPE Annual Conference, pp. 1280-1284 (2006).
Colbert, J., Concepts of Precision Tube Extrusion for Medical and Healthcare Applications, *Antec 95*, vol. III, pp. 3375-3382 (1995).
Colbert, J., High Quality Tube Extrusion for the Medical Device Industry, Polymers for the Medical Industry, paper 4 (1999).
Comim, L. M. et al., Effect of the Extrusion Process on the Bactericidal Performance of Biocidal Polypropylene Catheters, Polymer-Plastics Technology and Engineering, 51(3), pp. 289-295 (2012).
Daniels, U. et al., How Injection Moulding Tool Coating Affects the Demoulding Force, Kunststoffe/German Plastics, 79 (1), pp. 42-44 (1989).
Dowler, B. et al., How Low Can You Go? Optimising Cooling of Small Injection Moulded Parts, *Antec 97*, vol. 1, pp. 946-953 (1997).
Fallon, M., Resins Flow Better in TiN-Coated Molds, Plastics Technology, 36 (6), pp. 41-43 (1990).
Farzaneh, S. et al., Critical Factors in Extruding Catheter Tubing From Polyamide, Medical Device & Diagnostic Industry, 24 (11), pp. 54-60 (2002).
Ferrandino, M., Tubing Extrusion Made Easier, Part 1, *Medical Device Technology*, 15 (8), pp. 12-15 (2004).
Gupta, A. et al., Influence of a Rotating Tip on the Properties of Tubing Made Using a Crosshead Tubing Die, *International Polymer Processing*, 14 (1), pp. 51-56 (1999).
Kaiser, W. et al., Injection Moulds. Titanium Nitride Coating Improves Injection Moulding of Thermoplastics, Plastverarbeiter, 40 (10), pp. 81-91 (1989).
Kazmierska, K. et al., Determination of Urethral Catheter Surface Lubricity, Journal of Materials Science, Materials in Medicine, 19(6), pp. 2301-2306 (2008).
Kirkland, C., Nanomoulding Meets the Medical Catheter Tip, *Injection Molding*, 9 (10), pp. 79-80 (Oct. 2001).

(56) References Cited

OTHER PUBLICATIONS

Machado, A., Multi Lumen Die Design and Techniques, *Conference Medical Manufacturing*, Paper 2.2.3 (1990).
Martini, L. G. et al., Manufacturing High Quality Urinary Catheters, *Medical Device Technology*, 20 (1), pp. 18-19 (2009).
Mori, K. et al., Development of Polymer-Molding-Releasing Metal Mold Surfaces with Perfluorinated-Group-Containing Polymer Plating, *Journal of Applied Polymer Science*, 90 (9), pp. 2549-2556 (2003).
Navabpour, P. et al., Evaluation of Non-Stick Properties of Magnetron-Sputtered Coatings for Moulds Used for the Processing of Polymers, Surface & Coatings Technology, 201 (6), pp. 3802-3809 (2006).
O'Neil, C., Selecting Materials for Mission-Critical Catheters, *European Medical Device Technology*, 1 (9), pp. 48-55 (2010).
Person, T. J. et al., The Effect of Die Materials and Pressure-Dependent Slip on the Extrusion of Linear Low-Density Polyethylene, *Journal of Rheology*, 41 (2), pp. 249-265 (1997).
Reilly, J. F., Fast Fourier Transform Analysis of Melt Fractured Extrudate, Conference Polymer Rheology 99, paper 6 (1999).
Schut, J. H., Moving Die Parts Change Profile Shapes "On the Fly", *Plastics Technology*, 52 (4), pp. 45, 47 (2006).
Schut, J. H., Medical Tubing: Tinier Than Ever and Much More Complex, *Plastics Technology*, 53 (4), pp. 70-73 (2007).
Shearer, G., et al., Extrusion of LLDPE Through Polypropylene Coated Dies, Annual Technical Conference, vol. I, pp. 73-77 (1999).
Stein, O., Extrusion of Medical Tubing, *Plastics in Medical Technique*, pp. 179-191 (2002).
Zhao, Danyang et al., Numerical Simulation and Experimental Study of Polymer Micro Extrusion Flow, IEEE International Conference on Mechatronics and Automation, pp. 3155-3160 (2009).
No Author, BM Equips Catheter Facility, Plastics and Rubber Weekly, 1817, p. 9 (1999).
No Author, Cool Small Mold Cores Faster with New Water Transfer System, *Plastics Technology*, 24 (8), pp. 48-49 (1978).
No Author, Enhancing the Economic Efficiency in the Production of Catheter Hoses, Kunststoffe-Synthetics, 50 (1), pp. 14-15 (2003).
No Author, Extrusion Plants for Continuous Hollow Profile Manufacture, Plastverarbeiter, 49 (10), p. 152 (1998).
No Author, High-Tech Plant for High Precision Flexible Tube Extrusion for Cardiac Catheters Application, Plastverarbeiter, 49 (7), pp. 26-27 (1998).
No Author, Manufacturing Medical Catheter Tubes, Extrusion, 10 (5), pp. 18-19 (2004).
No Author, Medical Tubing Can Be Configured on the Fly, British Plastics and Rubber, p. 10 (2006).
No Author, New Dies Fine-Tune Tiniest Medical Tubes, *Plastics Technology*, 48 (9), p. 17 (2002).
No Author, One-Piece Catheter, *Plastics and Rubber Weekly*, 1264, p. 8 (1988).
No Author, One-Piece Catheter Cuts Manufacturing Costs, *Biomedical Materials*, pp. 4-5 (1990).
No Author, Surface Treatments Extend Tool Life, Plastics Technology, 43 (3), p. 29 (1997).
International Search Report and Written Opinion, counterpart PCT Appl. No. PCT/US2016/046387, dated Dec. 2, 2016 (9 pages).

\* cited by examiner

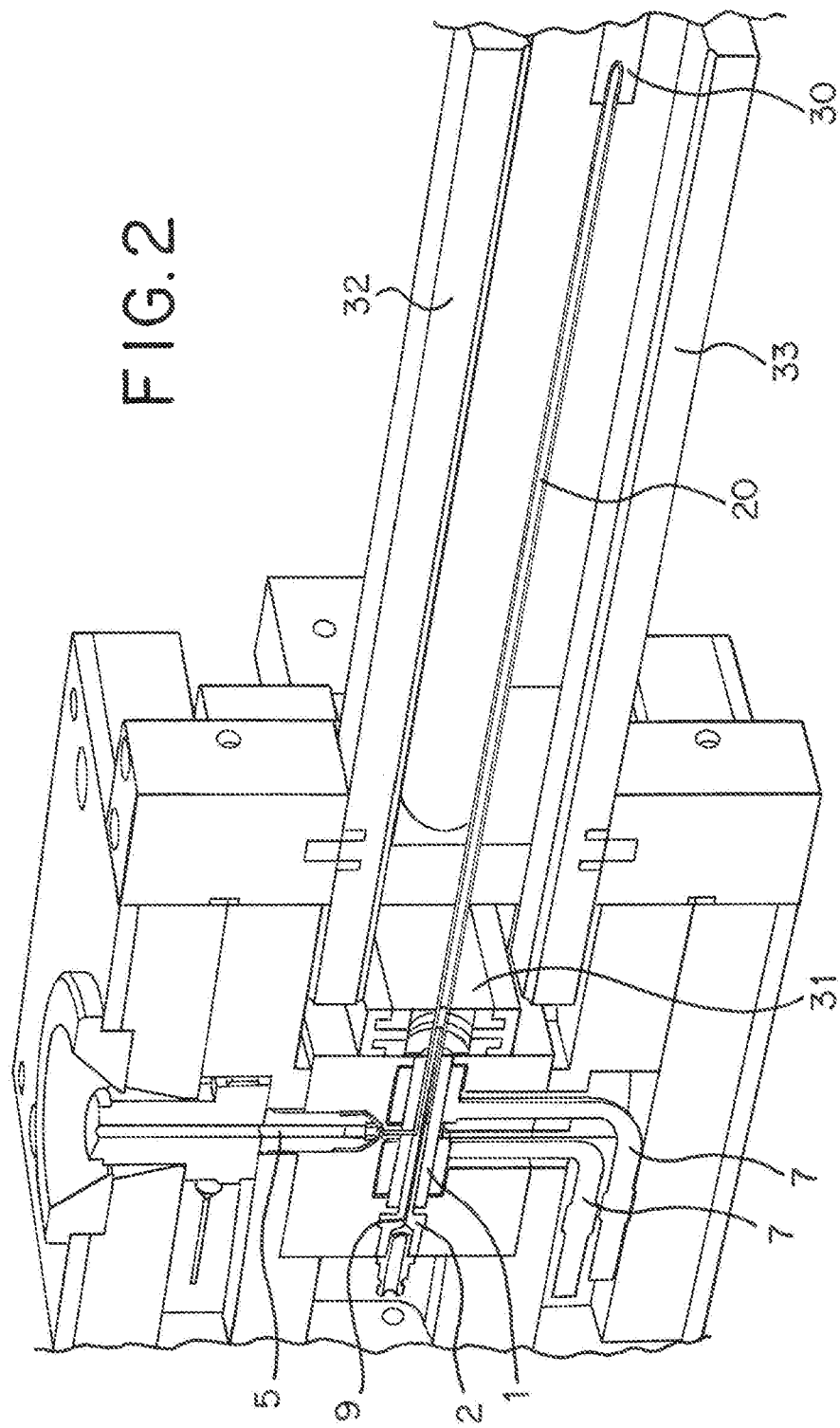

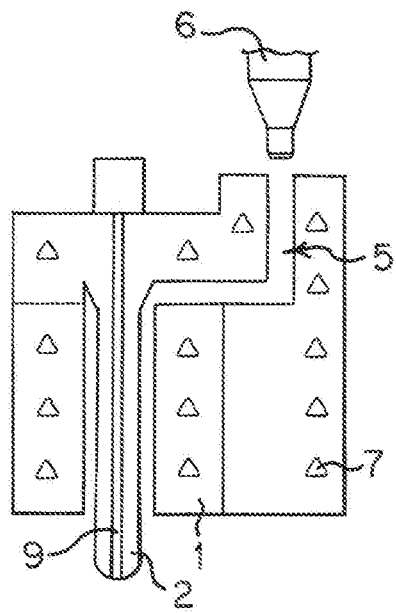
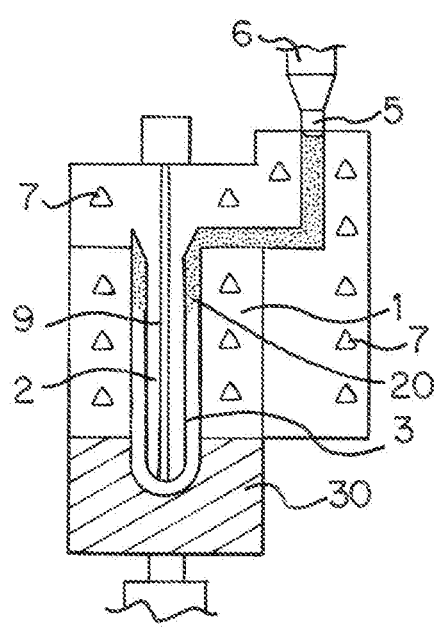
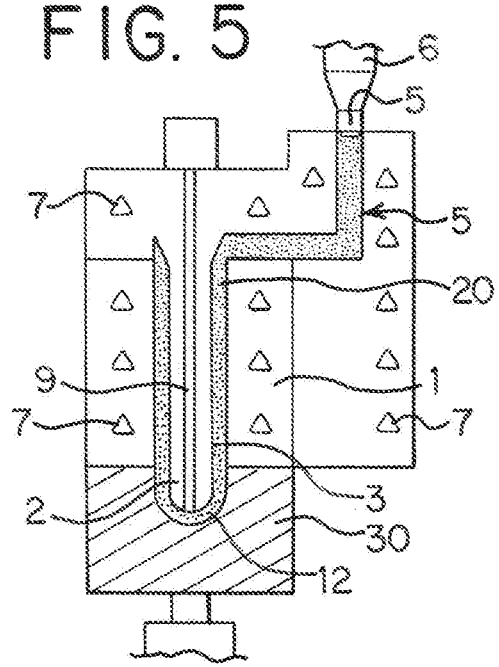
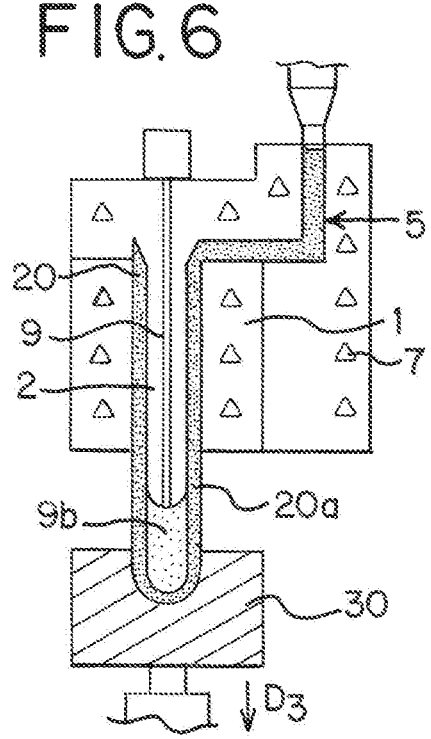

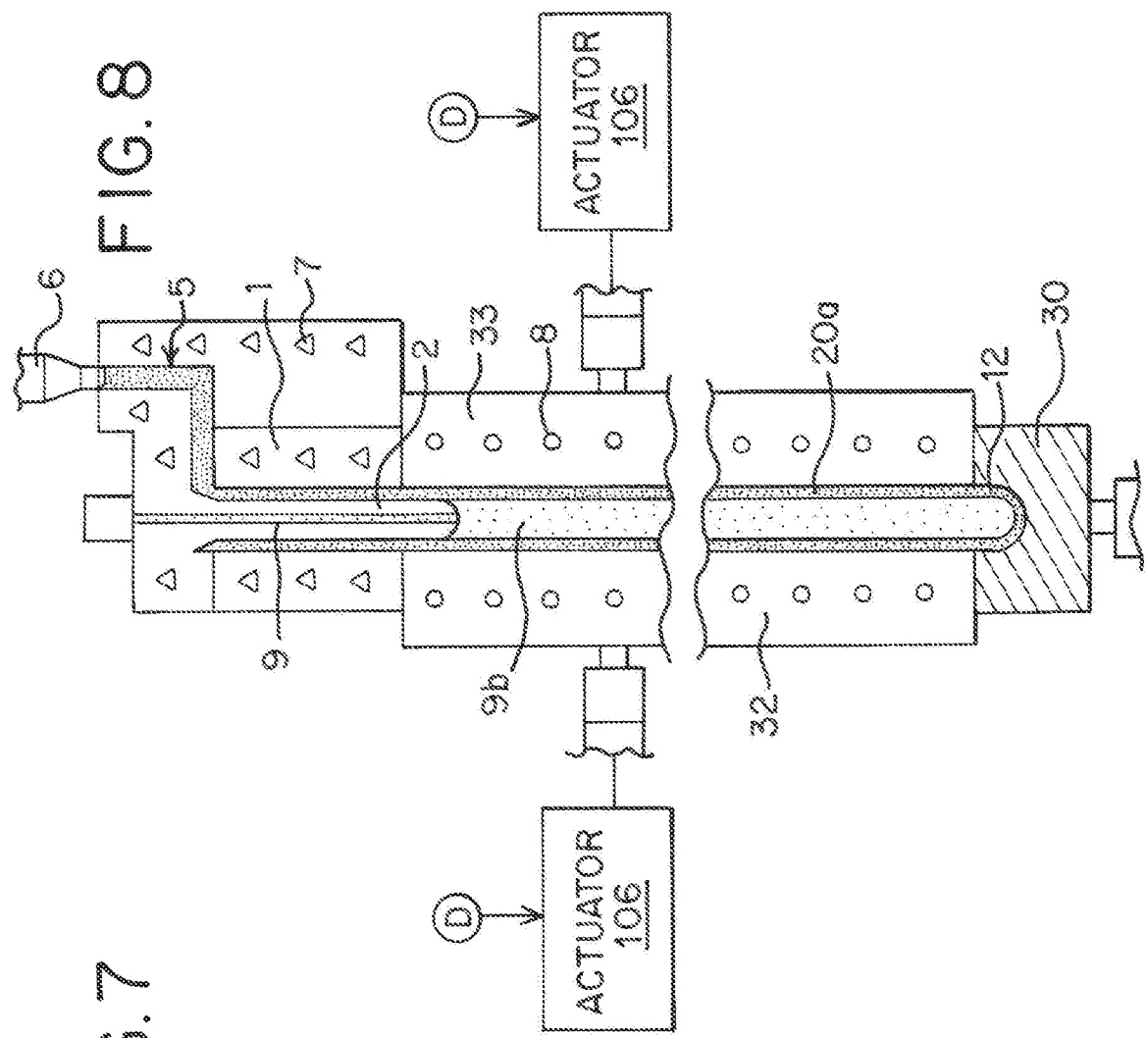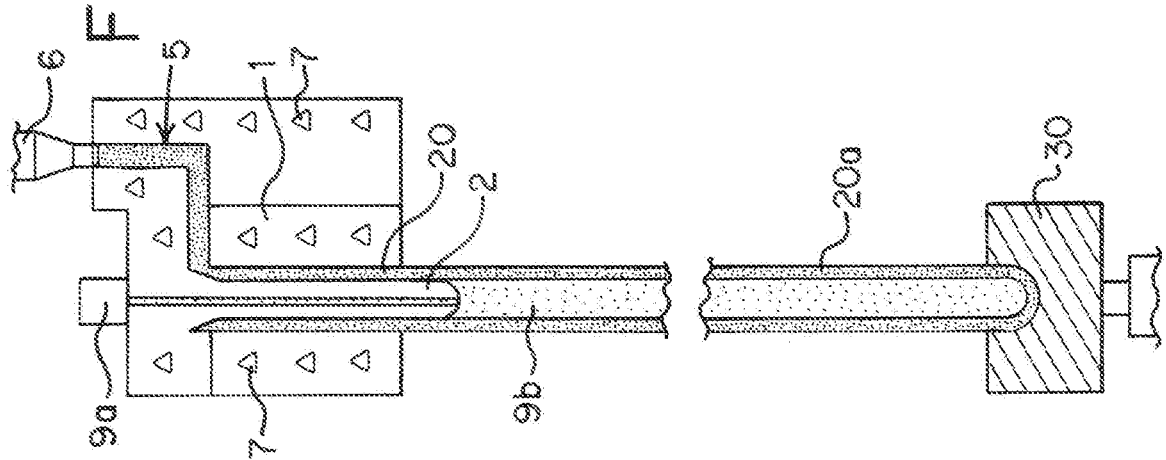

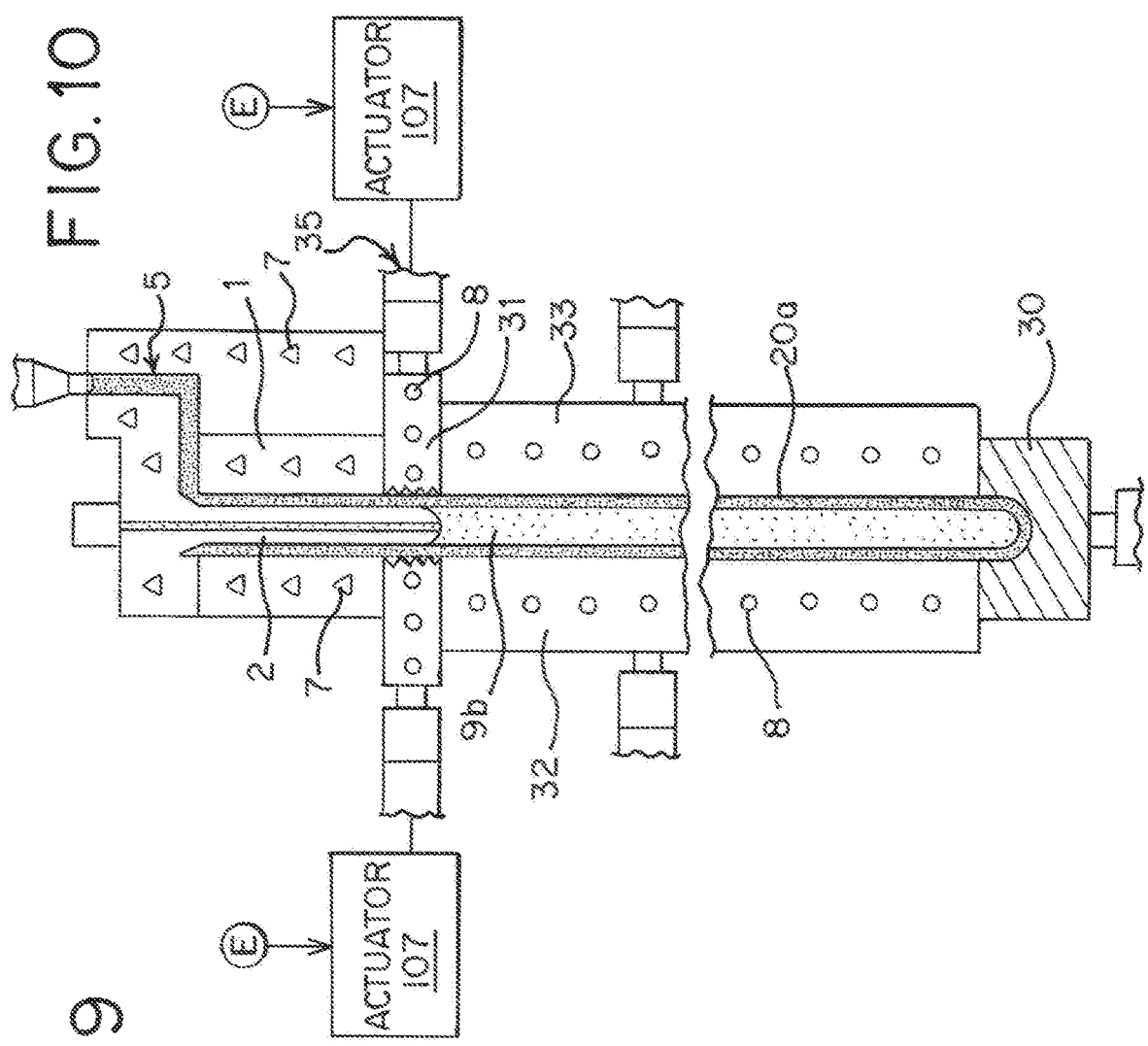
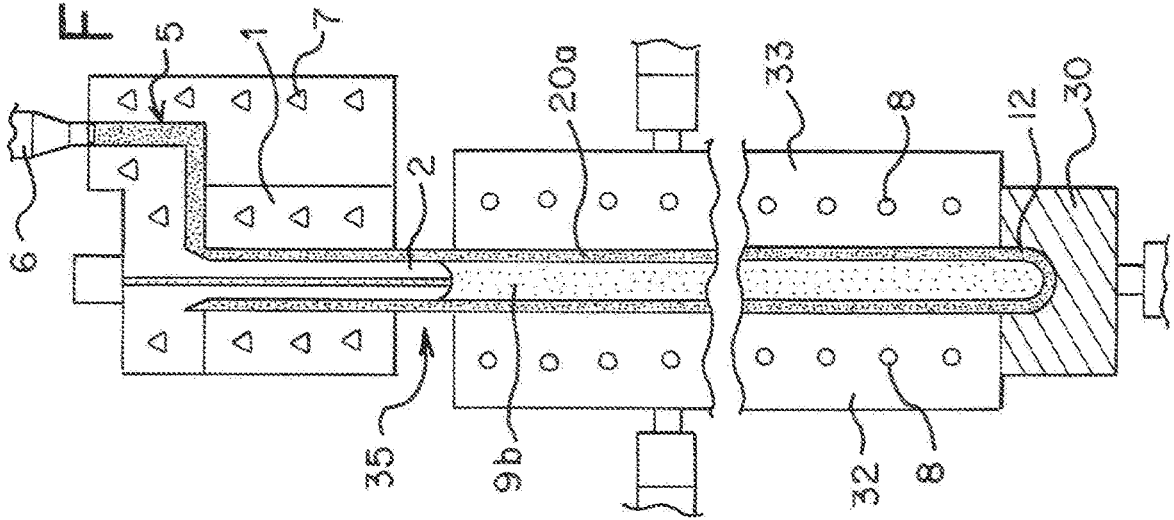

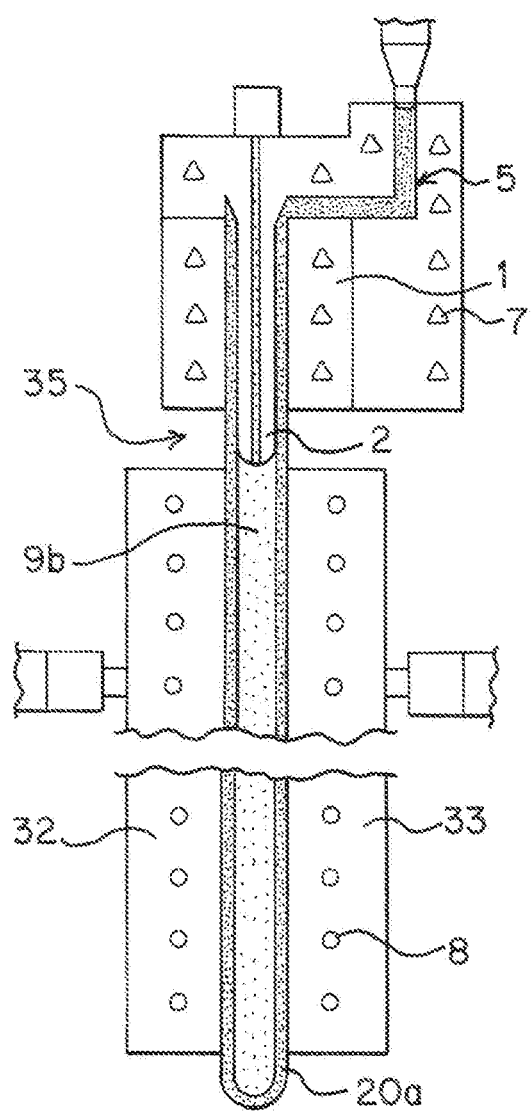
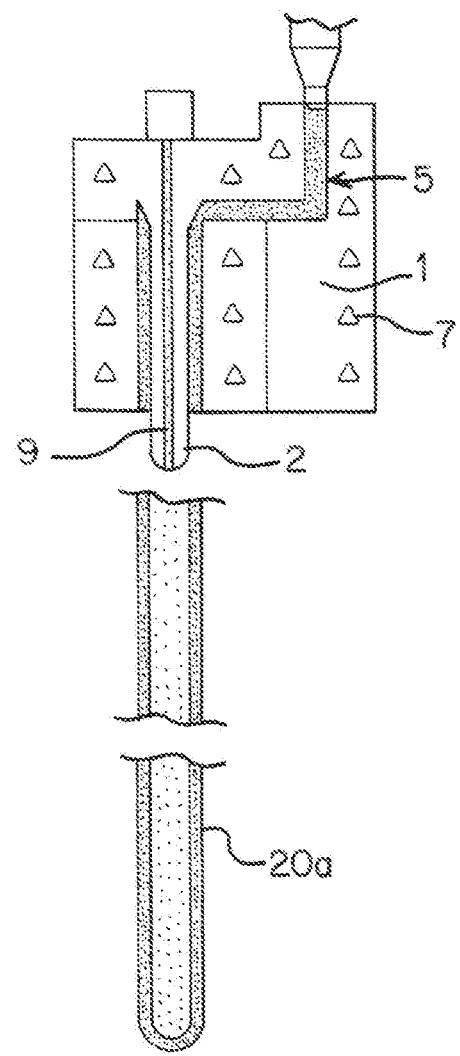
FIG. 11
FIG. 12

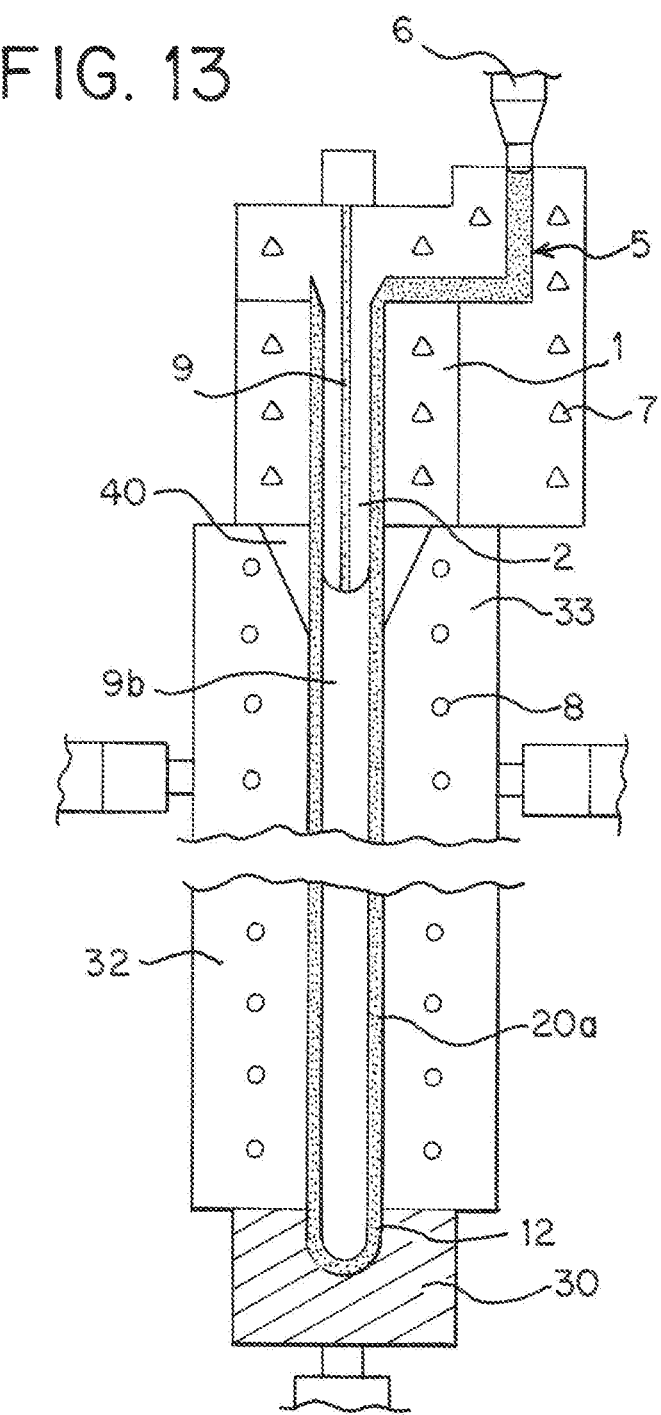

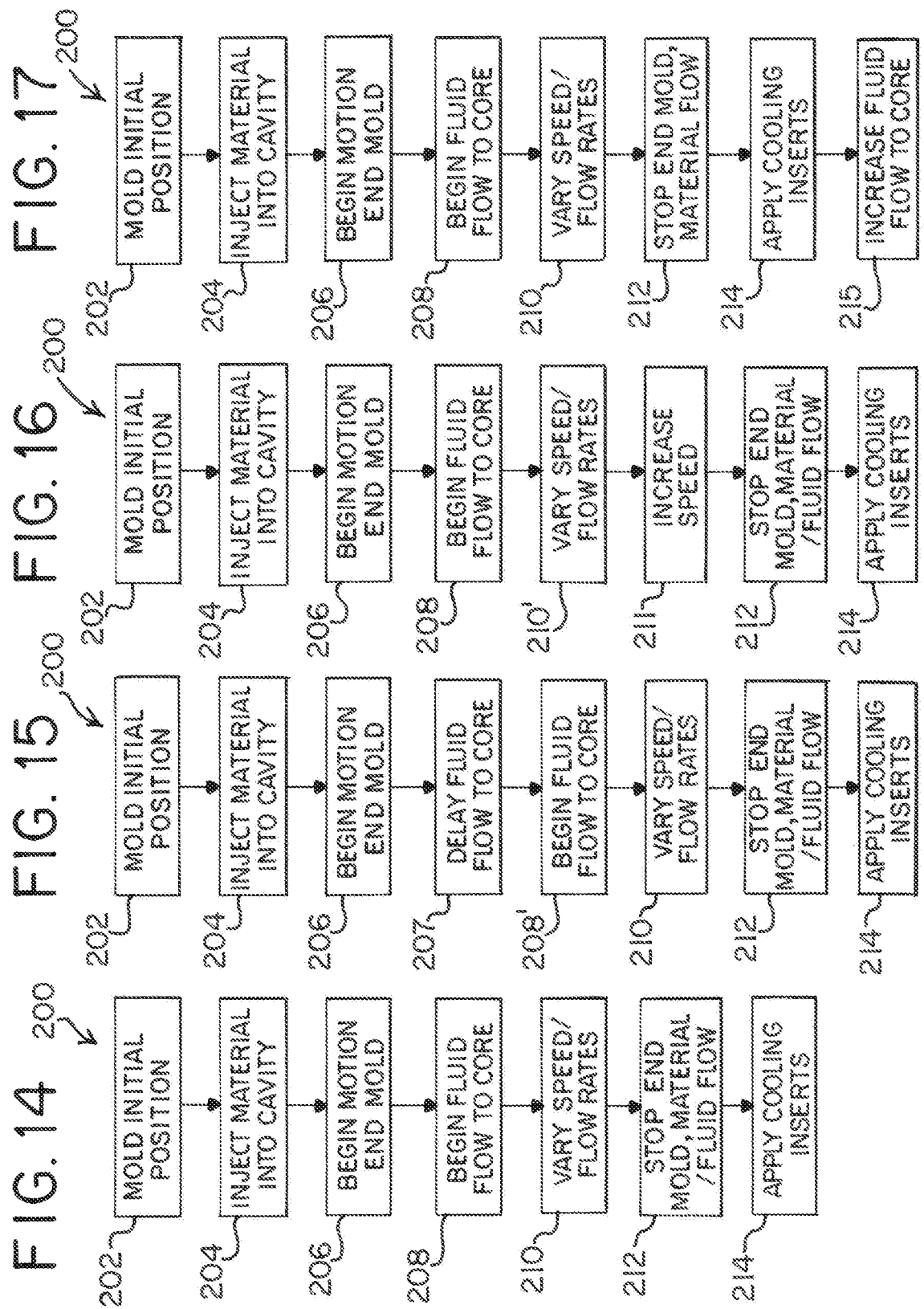

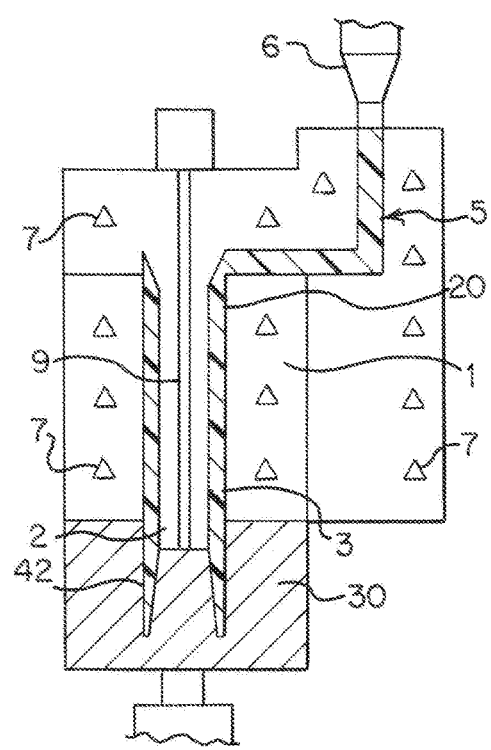
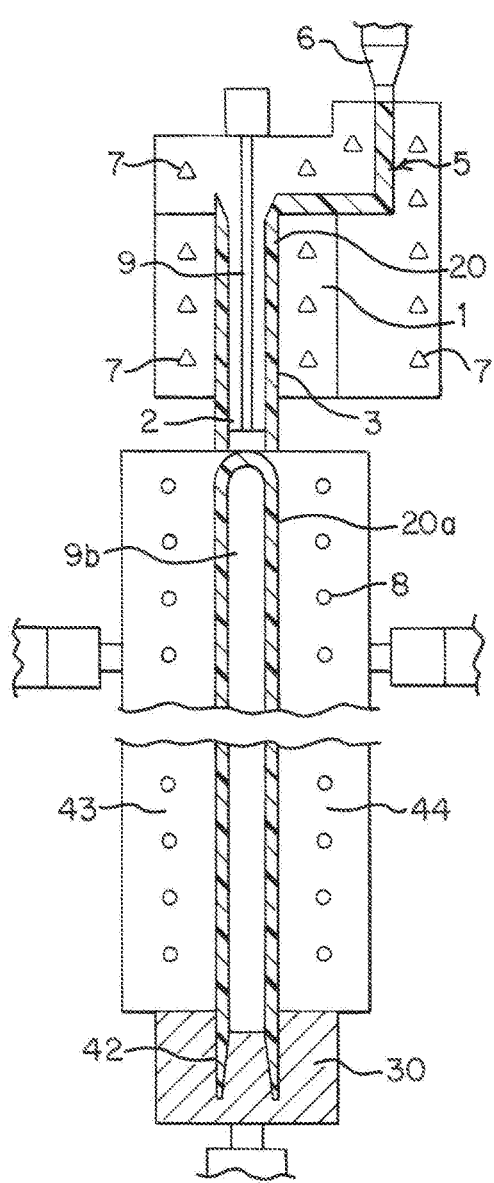

METHOD AND APPARATUS FOR MOLDING AN ELONGATED HOLLOW ARTICLE

The present application is a U.S. National Stage of PCT International Patent Application No. PCT/US2016/046387, filed Aug. 10, 2016, which claims the benefit of U.S. Provisional Application No. 62/211,290, filed Aug. 28, 2015, both of which are hereby incorporated herein by reference.

BACKGROUND

The present disclosure relates to a method and apparatus for molding an elongated hollow article, such as a urinary catheter.

As explained in U.S. Pat. No. 4,750,877, there is a need in the art of molding plastic products to mold hollow plastic parts. For instance, there are many hollow plastic parts used in the field of medical products, catheters being one example.

Catheters pose a considerable challenge to mold. Catheters have a relatively small diameter passage (on the order of a couple of millimeters) that often must be maintained over a considerable length (on the order of 40 cm for catheters designed for use in men). Further, catheters must have a consistent flex pattern and avoid "kinking" when bent or flexed. Moreover, catheters typically have a longitudinally extending channel extending through the thin catheter wall.

In the art of injection molding, it has been the case that when plastic is melted and forced to flow into a cavity about a fine, small diameter core or core pin, the pressure of injection forcing the melt into the mold cavity tends to displace the core from its substantially-centered, straight-line configuration relative to the central axis of the mold cavity. Displacement of the core relative to the interior surface of the mold cavity is also frequently caused by an imbalance in the flow characteristics of the hot melt as it enters the mold cavity and passes along the length thereof in substantially surrounding relation to the core. A number of factors may contribute to the imbalance, but the general tendency of the imbalance is to cause uneven forces to be exerted on the core pin, resulting in its displacement from the aforementioned and preferred straight-line configuration. Whatever the cause of the displacement, this displacement is undesirable where a straight-line configuration of the central hole, as well as the shank portion, of the product is required.

Consequently, injection molding has generally been limited to relatively short tubular lengths in relation to the diameter of the central passage. If, for example, the tubular product is to be relatively long, which is quite common in the medical industry generally and relative to catheters in particular, a small hole, especially a hole in a thin walled tube, is extremely difficult to make with any great degree of accuracy. In addition, different materials provide different problems.

Another problem generally associated with the injection molding technique of products of the type referred to above is the breakdown of the plastic material utilized to form the tubular product when the material is forced to travel along what may be referred to as a circuitous path from the point of leaving the injection nozzle to the point of entering and passing along the length of the mold cavity. This is particularly true when the plastic material, after being melted, is forced to flow along a circuitous path or a path including one or more right angles at a relatively high speed. Attempts to slow the speed of injection of the inflowing melt however have met with little success especially in the formation of thin walled tubular products. This is primarily because the melt rapidly cools and therefore solidifies as it flows along the length of the mold cavity especially at slow speeds. Accordingly, when using injection molding techniques at such slow speeds, attempts have been made to raise the temperature of the plastic material to a somewhat higher than normal temperature, prior to injection, to overcome the problems of the prior art. This higher temperature results in a degradation of many plastic materials, which has obvious disadvantages in the making of thin walled tubular products.

As set forth in detail below, the present disclosure relates to a molding apparatus and a molding process embodying advantageous alternatives to existing apparatuses and methods, which may provide for improved molding of elongated hollow articles, such as urinary catheters.

SUMMARY

As explained above, one of the technical factors limiting the use of conventional injection molding for catheter manufacture is the high injection pressures required to fill the cavity and the difficulty of producing long tubular parts, e.g. up to and in excess of 40 cm, with adequate internal and outer diameter tolerances and good reproducibility. Therefore, it is an object of the disclosure to provide an improved method and apparatus for molding of elongated hollow articles, in particular for the manufacture of urinary catheters.

According to an aspect of the present disclosure, a method of injection molding of an elongated hollow article comprises the steps of:

injecting a molding material at a material flow rate into a mold comprising a stationary outer mold with a substantially tubular mold cavity, a moveable end mold with an end mold cavity aligned with the tubular mold cavity, and a stationary elongated mold core with a fluid channel therethrough, the mold core extending through the tubular cavity;

moving the end mold at a speed in a linear direction from a first position with the end mold cavity aligned with the central mold cavity to a second position at a predetermined distance between the end mold and the outer mold (which may be selected to produce the hollow article in a desired length);

supplying a fluid at a fluid flow rate to the fluid channel in the elongated mold core; and varying at least one of the material flow rate, the end mold speed and the fluid flow rate as the end mold moves from the first position to the second position.

This method may be advantageous because this method can be adopted for producing elongated articles, such as urinary catheters, of a variety of lengths, in principle any lengths. This method is particularly advantageous where the elongated hollow article is a catheter with a proximal tip and a distal funnel-shaped connector end. Hereby, the costs of manufacturing such articles can be reduced since the articles can be produced in a reduced amount of molding processes, preferably a single molding process.

According to an embodiment of the method, the varying step includes balancing the material flow rate, the end mold speed and the fluid flow rate.

According to embodiments, the varying step includes increasing the material flow rate after the end mold begins moving, and decreasing subsequently the material flow rate before the end mold reaches the second position. In fact, the varying step may include increasing the material flow rate immediately after the end mold begins moving, and decreasing subsequently the material flow rate before the end mold reaches the second position.

According to further embodiments, the varying step includes progressively increasing the end mold speed as the end mold moves between the first position and the second position. Moreover, the varying step may include progressively increasing the end mold speed as the end mold moves between the first position and a third position between the first and second positions, and substantially increasing the end mold speed as the end mold moves between the third and second positions.

According to the embodiments, the supplying step may occur simultaneously with the moving step. Alternatively, the supplying step is delayed relative to the moving step. It will be noted that the fluid provided inside the article as a consequence of the supplying step stabilizes the material of the molded portion of the article during the molding process as this portion leaves the inner support of the elongated mold core. The fluid also may help solidify the material and ensure the shape of the article even though the material may not yet be solidified immediately after leaving the elongated mold core.

The method may also include the step of cooling the hollow article when the end mold has reached the second position. In fact, the cooling may be performed by a set of cooling mold blocks or inserts that are provided for encompassing the molded portion of the article by radially inward movement. In addition, the cooling mold blocks may be provided with inner contacting surfaces resembling the shape of the tubular mold cavity. Hereby, a rapid cooling of the article as well as the surface outer shape of the article is provided.

In a further embodiment, the cooling mold blocks are formed with end contacting surfaces having an end section geometry, and the varying step may include increasing the fluid flow rate immediately before the end mold reaches the second positon. Hereby, a sub-process of blow molding the second end shape of the elongated hollow article is provided. This is particularly advantageous when producing a catheter with a proximal tip and a distal, funnel-shaped connector end.

The method may further include cutting the molded article away from the mold by providing a cuter in a gap between the cooling blocks and the outer mold with the end mold at the second position. Hereby the molded article is easily freed from the mold to complete the molding cycle.

The method may also include controlling the temperature of the outer mold to maintain a temperature at which the molding material is liquidized. In addition, embodiments of the method may include controlling the temperature of the elongated central mold core to maintain a temperature similar to that of the outer mold. More particularly, such temperature is above the melting temperature of the molding material, such as between +130° C. and +350° C. depending on the polymer material used for the molding process. Further, embodiments may control the temperature of the movable end mold to maintain a temperature lower than that of the outer mold. In particular, the temperature of the movable end mold is kept below the melting temperature for the molding material, such as between +20° C. and +130° C., which is also well below the glass temperature of the polymer materials used for molding the article.

In a similar fashion, a molding apparatus for an elongated hollow article may include:

a mold comprising a stationary outer mold with a substantially tubular cavity formed therein, a moveable end mold with an end mold cavity alignable with the tubular mold cavity, and a stationary elongated mold core with a fluid channel therethrough, the mold core extending through the tubular cavity;

a molding material metering device coupled to the substantially tubular cavity to control the supply of a molding material to the substantially tubular cavity;

an actuator coupled to the end mold to move the end mold from a first position with the end mold cavity aligned with the central mold cavity to a second positon at a predetermined distance between the end mold and the outer mold; and a valve coupled to the fluid channel to control the supply of a fluid to the fluid channel, wherein the molding apparatus is configured to vary a material flow rate of the molding material via the metering device, to vary a speed of the end mold via the actuator or to vary a fluid flow rate of the fluid via the valve as the end mold moves between the first positon and the second position.

According to embodiments, the molding apparatus is configured to balance the material flow rate, the end mold speed and the fluid flow rate as the end mold moves between the first positon and the second position.

In addition, the molding apparatus may be configured to increase the material flow rate after the end mold begins moving, and decrease subsequently the material flow rate before the end mold reaches the second position. In fact, the molding apparatus according to certain embodiments is configured to increase the material flow rate immediately after the end mold begins moving, and decrease subsequently the material flow rate before the end mold reaches the second position.

According to further embodiments, the molding apparatus is configured to progressively increase the end mold speed as the end mold moves between the first position and the second position. In particular, the molding apparatus may be configured to progressively increase the end mold speed as the end mold moves between the first position and a third position between the first and second positions, and to substantially increase the end mold speed as the end mold moves between the third and second positions.

According to certain embodiments, the molding apparatus is configured to increase a fluid flow rate of the fluid via the valve simultaneously as the end mold moves between the first positon and the second position. Alternatively, the molding apparatus is configured to increase a fluid flow rate of the fluid via the valve after the end mold begins to move between the first positon and the second position.

Further, the molding apparatus may be configured to increase the fluid flow rate immediately before the end mold reaches the second positon.

According to additional embodiments, the molding apparatus is configured to cool the hollow article when the end mold part has reached the second position. The molding apparatus may include a set of cooling mold blocks, and wherein the molding apparatus is configured to move the cooling mold blocks radially inward to encompass the molded portion of the hollow article. The cooling mold blocks may include inner contacting surfaces resembling the shape of the tubular mold cavity and end contacting surfaces having an end section geometry, and the molding apparatus is configured to supply fluid to the core to form said end section geometry.

The molding apparatus may include a cuter in a gap between the cooling blocks and the outer mold with the end mold at the second position.

Embodiments of the molding apparatus may be configured to control the temperature of the outer mold to maintain a temperature at which the molding material is liquidized. Moreover, the molding apparatus may be configured to control the temperature of the elongated central mold core to maintain a temperature similar to that of the outer mold. Further, the molding apparatus may be configured to control the temperature of the movable end mold to maintain a temperature lower than that of the outer mold.

The molding apparatus may include one or more controllers coupled to one or more of the metering device, the actuator and the valve, the one or more controllers configured to control the one or more of the metering device, the actuator and the valve. The one or more controllers may each comprise one or more processors programmed to control the one or more of the metering device, the actuator and the valve.

BRIEF DESCRIPTION OF THE DRAWINGS

The disclosure will be more fully understood from the following description taken in conjunction with the accompanying drawings. Some of the figures may have been simplified by the omission of selected elements for the purpose of more clearly showing other elements. Such omissions of elements in some figures are not necessarily indicative of the presence or absence of particular elements in any of the exemplary embodiments, except as may be explicitly delineated in the corresponding written description. None of the drawings is necessarily to scale.

FIG. 2 is a perspective view, in partial cross-section, of the embodiment of the molding apparatus of FIG. 1 during the molding process;

FIGS. 3-12 are schematic cross-sectional views of the embodiment of the molding apparatus of FIGS. 1 and 2 during different stages of the molding process;

FIG. 13 is a schematic cross-sectional view of an alternative embodiment of the molding apparatus;

FIG. 14 is a flowchart of an embodiment of a molding process used to manufacture a catheter;

FIG. 15 is a first example of the molding process of FIG. 14;

FIG. 16 is a second example of the molding process of FIG. 14;

FIG. 17 is a third example of the molding process of FIG. 14;

FIG. 18 is a schematic cross-sectional view of a further alternative embodiment of a molding apparatus in a first stage;

FIG. 19 is a schematic cross-sectional view of the embodiment of the molding apparatus of FIG. 18 in a second stage;

DETAILED DESCRIPTION OF VARIOUS EMBODIMENTS

Figure 1:
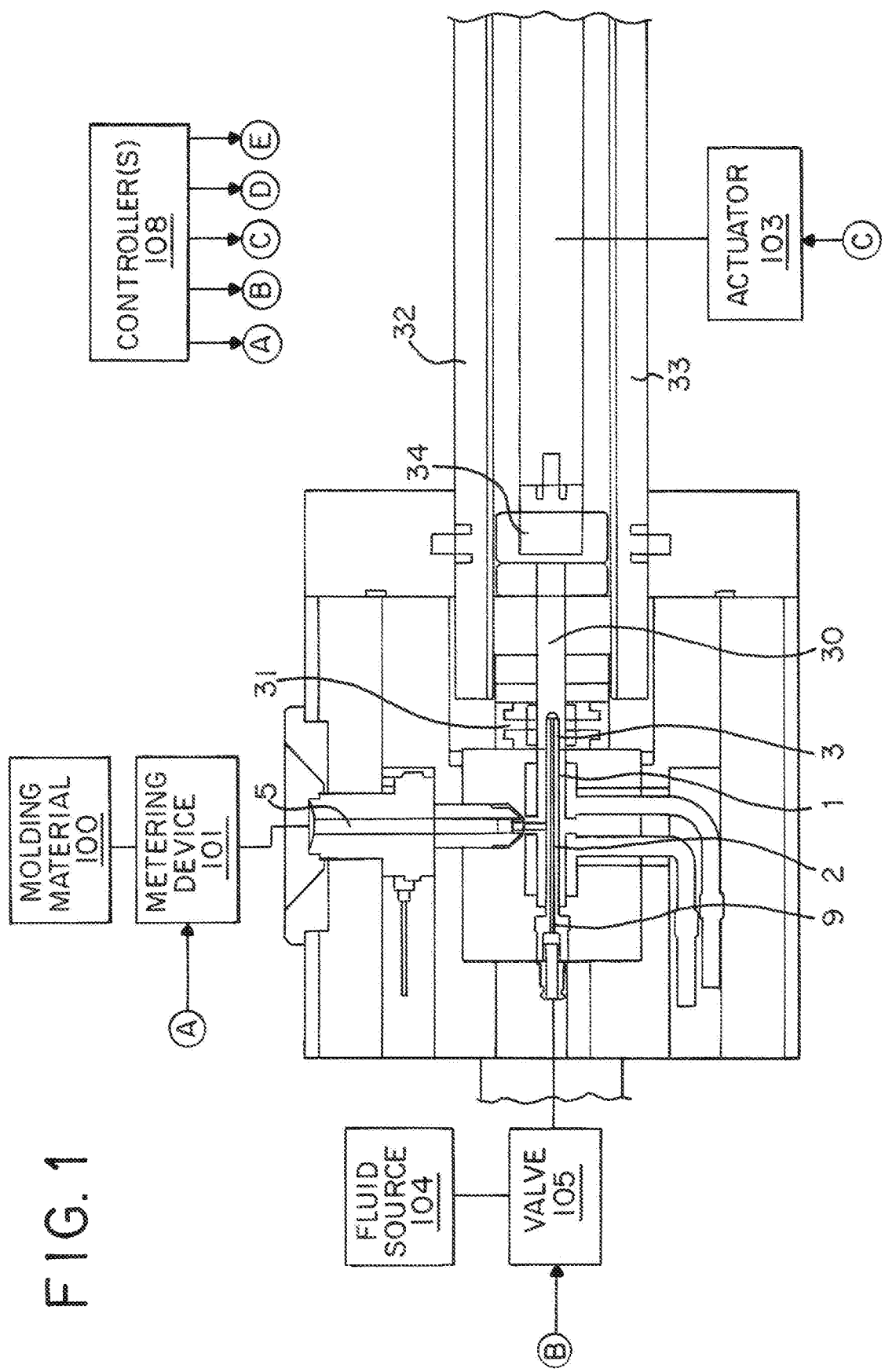
FIG. 1 is a view, in partial cross-section, of an embodiment of a molding apparatus in an initial stage of a molding process.

With reference to FIGS. 1-12, an embodiment of a molding apparatus and a molding sequence is disclosed. In particular, FIGS. 1 and 2 illustrate an embodiment of a molding apparatus, and FIGS. 3-12 illustrate, step by step, a molding sequence that may be carried out using the apparatus of FIGS. 1 and 2. While the molding apparatus appears to be disposed horizontally in FIGS. 1 and 2, this is for ease of illustration only. The molding apparatus would be disposed more typically in a substantially vertical orientation in use, similar to the orientation illustrated in FIGS. 3-12.

With reference initially to FIGS. 1 and 2 (as well as FIGS. 3 and 4), the molding apparatus includes a stationary outer mold 1 and a stationary elongated mold core 2, which mold 1 and core 2 define a cavity 3 therebetween. The cavity 3 is tubular in shape. According to certain embodiments, the tubular cavity 3 is cylindrical with an annular cross-section. However, it will be recognized that other cross-sectional shapes may be provided.

An inlet 5 may be provided substantially radially to the elongated mold core 2 to receive molding material, such as a thermoplastic elastomer for example. In fact, a supply of molding material 100 may be provided, and may be coupled to the inlet 5 via a metering device 101, which metering device 101 controls the rate at which molding material is provided to the inlet 5. The elongated mold core 2 is provided with an end section so that the extent of the cavity 3 is limited at the inlet 5 but extends beyond the outer mold 1 and into an end mold 30 (as best seen in FIG. 4, for example). In the end mold 30, there is provided an end cavity 12.

The end cavity 12 of the end mold 30 may be formed to define the tip of the catheter. In such a circumstance, the end cavity 12 may have a rounded shape that defines the catheter tip, such a Nelaton tip, and the core 2 may have a similar shape to match. See FIGS. 3-13. Accordingly, the end mold 30 may also be referred to as a tip mold, and the end cavity 12 as a tip end cavity. Alternatively, the end cavity 12 of the end mold 30 may be formed to define the funnel-shaped connector end. In such a circumstance, the end cavity may have a tubular shape (e.g., cylindrical with an annular cross-section), with an inner taper. See FIGS. 18-21.

As is illustrated in FIGS. 4 and 5, the end mold 30 is in its initial position positioned adjacent the outer mold 1 so that the tubular cavity 3 and the end cavity 12 are aligned and the end of the elongated mold core 2 extends into the end cavity 12. The outer mold 1 and the elongated mold core 2 maintained at an elevated temperature by providing a heater 7 therein, which heater 7 may be in the form of an electrical or (heated) fluid circuit, for example. The stationary mold members, i.e., the outer mold 1, the elongated mold core 2 and the inlet 5, are thereby maintained at a temperature above the melting temperature of the molding material, e.g. +175° C. for polyvinylchloride (PVC) or in the range of +160° C. to +350° C. for other polymer materials.

At an initial stage of the molding process, the cavity 3 is filled with molding material 20 in accordance with a conventional injection molding process (see FIGS. 4 and 5). As the cavity 3 (including the end cavity 12) is filled, as shown in FIG. 5, the end mold 30 starts moving in the direction $D_3$, as shown in FIG. 6. As illustrated in FIG. 1, the end mold 30 may be coupled (i.e., directly or indirectly attached or connected to) an actuator 103 that may be controlled to move the end mold 30 relative to the outer mold 1 and the elongated mold core 2. The actuator 103 may be a linear actuator, for example.

As the end mold starts moving in the direction $D_3$, pressurized fluid may be supplied from a pressurized fluid source 104 (see FIG. 1) through a central axial fluid channel 9 in the elongated mold core 2 and into the internal volume 9b of the molded portion 20a of the product (see FIG. 6). The pressurized fluid is provided inside the article during the molding to assist in forming the inner surface of the hollow article and avoid the formation of a vacuum inside the hollow portion 9b of the article. According to the embodiments disclosed herein, the pressurized fluid is air. It will be recognized that the fluid channel 9 can be used for fluids other than air, such as a gas composition, a liquid mixture, a reactive liquid mixture, etc. The exact timing of the supply of the pressurized fluid and/or the amount of pressurized fluid supplied to the internal volume 9b of the molded portion 20a is described in detail below, and the supply and/or amount of pressurized fluid supplied may be controlled via a valve 105 connected between the pressurized fluid source and the axial fluid channel 9.

The end mold 30 is kept cool, e.g. at +40° C. for PVC (and +20° C. to +130° C. for other polymers), i.e. well below the melting temperature of the polymer molding material 20. The molding material 20 is in a liquidized state in the heated section of the mold but is cooled and thereby solidifies as it leaves the heated mold members. The pressurized air supplied to the inside of the product formed stabilizes the molded portion 20a of the tubular product that is in the process of being molded. The molded portion 20a is thereby prevented from collapsing as it is pushed off the elongated mold core 2 by the liquidized molding material 20, which is continuously being supplied under a predetermined pressure through the inlet 5. This pushing of the molded product is also assisted by the supply of pressurized air through the fluid channel 9 and into the inner volume 9b of the molded portion 20a as well as the movement of the end mold 30, which also assists the advancement of the molded portion 20a off the elongated mold core 2. As illustrated in FIG. 1, the end mold 30 is arranged on a sledge 34 arranged for a linear movement in the direction $D_3$.

With this movement of the end mold 30, the tubular form of the molded portion is extended in length, as indicated in FIG. 7, in a process that has features similar to, but not the same as, a conventional extrusion process. This stage of the molding process is also illustrated in FIG. 2. As the required length of the tubular product is about to be reached, a set of cooling mold blocks 32, 33 are provided around the tubular molded portion 20a to cool the product, as shown in FIG. 8. According to certain embodiments, the mold blocks 32, 33 may be moved around the tubular molded portion 20a using one or more actuators 106 coupled (i.e., connected or attached directly or indirectly) to the mold blocks 32, 33. The cooling mold blocks 32, 33 may include a cooling system 8 (e.g., a coolant circuit including one or more passages for the movement of a coolant, such as water).

It will be recognized that the mold blocks 32, 33 may be used to add a predetermined pattern on the catheter surface. For example the inner surfaces of the mold blocks 32, 33 may be machined or fabricated such that when the tubular molded portion 20a is brought into contact with the inner surfaces of the mold blocks 32, 33 (for example, by selecting a particular size for the inner diameter of the cavity defined by the mold blocks 32, 33 or by increasing the air flow through the fluid channel 9), the catheter surface acquires a pattern. This pattern on the catheter surface can facilitate application of wetting agents and coating layers that are typically used to improve lubricity of catheters and facilitate insertion into the human body.

With the cooling blocks 32, 33 clamped around the molded product 20, as shown in FIG. 9, the molding cycle is coming toward an end and the cooling blocks 32, 33 follow the movement of the tubular product 20a and create a gap 35 between the cooling blocks 32, 33 and the mold 1. This cooling method is particularly suitable for materials sensitive to conventional cooling fluids, like water, oil, etc. A water bath can also be used to cool and solidify the part if needed.

A cutter 31 may be provided in the gap 35, as illustrated in FIG. 10. This cutter 31 preferably includes a set of knifes which guillotines the tubular product and thereby cuts away the molded product 20a from the hot mold. As shown in FIG. 10, the cutter 31 may preferably be provided with cooling system 8 (e.g., a coolant circuit including one or more passages for the movement of a coolant, such as water) so that the product is cooled when the cutter 31 is moved into its active position. As also illustrated in FIG. 10, the cutter 31 may be provided with one or more actuators 107 that move the cutter 31 (e.g., the set of knives) to cut the molded product from the hot mold.

When the product has been cut, the cutter 31 is removed and the end mold 30 is then moved further whereby the product 20a is held between the two cooling mold blocks 32, 33, as shown in FIG. 11. The product is thereafter freed as shown in FIG. 12, and the molding cycle may repeat by returning to the stage illustrate in FIG. 4, where the end mold 30 is returned to its initial position abutting the outer mold 1 disposed about or around the elongated mold core 2. An additional advantage of this process is that the core does not need to be removed as is required in a conventional injection molding process that used a core-pin support.

According to certain embodiments, the cooling mold blocks 32, 33 may be formed with a funnel cavity 40 at the mold facing end (see FIG. 13) so that when the mold blocks 32, 33 are clamped around the tubular molded product as shown in FIG. 9, the pressurized air being supplied from the fluid passage 9 of the elongated mold core 2 may be utilized to blow molding a funnel shape or another predetermined end geometry in the product prior to the cutting action at the stage illustrated in FIG. 10. The predetermined geometry of the hollow article may also comprise an oval shape at specific sections of the tube, or a structured outer surface pattern of the tube or parts of the tube, such as a honeycomb pattern or the like.

With the cooling blocks 32, 33 and the blow molding operation just described, it is possible to produce catheters with different outer diameters and inner diameters along the catheter length. For example, a catheter may be produced with a straight tube 15 cm long from the molded tip, followed by a gradual inner and outer diameter increase over the next 5 cm, followed by a straight tube with a larger inner and outer diameter (when compared with the first straight tube section) for the last 20 cm of a 40 cm long catheter.

Having described the molding apparatus and molding sequence with reference to FIGS. 1-13, an embodiment of a general molding process 200 to manufacture a catheter using a stationary outer mold 1, a stationary elongated mold core 2 and a moveable end mold 30 is illustrated in FIG. 14. As is explained below, the process may be varied to produce catheters of different shapes and sizes. In fact, a limited number of specific variants to the process 200 are illustrated in FIGS. 15-17. It will be recognized, however, that the process 200 envisions other variations in the process parameters as well, and a balancing of parameters may occur as part of the process 200 as is explained below.

Description of the process 200 begins at block 202 in FIG. 14 with the end mold 30 in its initial position adjacent the outer mold 1 so that the tubular cavity 3 and the end cavity 12 are aligned and the end of the elongated mold core 2 extends into the end cavity 12. See FIGS. 4 and 5. The process 200 then passes to block 204 with molding material being injected into the cavity 3, including the end cavity 12. After the cavity 3 and end cavity 12 are filled at block 204, motion of the end mold 30 relative to the outer mold 1 and the elongated mold core 2 is initiated at block 206, and flow of the fluid to the elongated mold core 2 is initiated at block 208. The process 200 then continues at block 210, wherein the speed of the end mold, the flow rate of the molding material and/or the flow rate of fluid to the mold core 2 may be varied. According to at least one embodiment of the process 200, during block 210, the speed of the end mold may be progressively increased as the length of the catheter is increased, while the flow rate of the molding material may be initially increased once movement of the end mold is initiated, before the flow rate is decreased to an approximately constant flow rate. At the same time, the flow of fluid (e.g., air) to the mold core 2 is maintained at a relatively constant rate. The changes in speed and flow rate of molding material may be performed in a series of discrete, stepwise changes, or the changes in speed and flow rate may vary in a continuous fashion from a starting value to an ending value. At the end of the process, the end mold is stopped, and the flow of molding material and fluid to the core 2 is halted at block 212. After block 212, cooling inserts may be advanced into contact with the catheter at block 214.

As reflected in the Examples below, there are a number of variations that may be implemented relative to the speed of the end mold, flow rate of the molding material and flow rate of fluid to the mold core 2. For example, the actions depicted at blocks 206, 208 may occur simultaneously, i.e., the end mold is set into motion at the same time the fluid flow is initiated to the mold core 2. Alternatively, as illustrated in FIG. 15, a delay (block 207) is introduced between the initiation of the motion of the end mold and the initiation of the fluid flow to the mold core 2. See also Example 2, below. The result of such a process may be a catheter with a rounded tip and a region of reduced inner and outer diameter immediately adjacent the tip. As illustrated in FIG. 16, a sudden increase in the speed of the end mold 30 may occur at block 211 prior to stopping the end mold, molding material flow and fluid flow at block 212. See also Example 3, below. The result of such a process also may be a catheter with a rounded tip and a region of reduced inner and outer diameter immediately adjacent the tip. As further illustrated in FIG. 17, a sudden increase in the fluid flow rate at block 215 after applying the cooling inserts at block 214 may cause the catheter diameter at the distal end to increase, such that a funnel shape may be formed at the distal end of the catheter in accordance with a catheter formed on the inner surface of the cooling inserts. See Example 4, below.

In general terms, the process 200 at blocks 206, 208 and 210 involves a balance between different parameters as they affect the motion of the catheter exiting the core 1. Considering the cylindrical shape of the extruding catheter, it may be most convenient to discuss the motion of the extruding catheter using cylindrical coordinates (from Tadmor & Gogos, Principles of Polymer Processing, 111 (John Wiley & Sons)):

$$\rho\left(\frac{\partial v_r}{\partial t} + v_r\frac{\partial v_r}{\partial r} + \frac{v_\theta}{r}\frac{\partial v_r}{\partial \theta} - \frac{v_\theta^2}{r} + v_z\frac{\partial v_r}{\partial z}\right) = -\frac{\partial P}{\partial r} - \left(\frac{1}{r}\frac{\partial}{\partial r}(r\tau_{rr}) + \frac{1}{r}\frac{\partial \tau_{r\theta}}{\partial \theta} - \frac{\tau_{\theta\theta}}{r} + \frac{\partial \tau_{rz}}{\partial z}\right) + \rho g_r$$

$$\rho\left(\frac{\partial v_\theta}{\partial t} + v_r\frac{\partial v_\theta}{\partial r} + \frac{v_\theta}{r}\frac{\partial v_\theta}{\partial \theta} - \frac{v_r v_\theta}{r} + v_z\frac{\partial v_\theta}{\partial z}\right) = -\frac{1}{r}\frac{\partial P}{\partial \theta} - \left(\frac{1}{r^2}\frac{\partial}{\partial r}(r^2 \tau_{r\theta}) + \frac{1}{r}\frac{\partial \tau_{\theta\theta}}{\partial \theta} + \frac{\partial \tau_{\theta z}}{\partial z}\right) + \rho g_\theta$$

$$\rho\left(\frac{\partial v_z}{\partial t} + v_r\frac{\partial v_z}{\partial r} + \frac{v_\theta}{r}\frac{\partial v_z}{\partial \theta} + v_z\frac{\partial v_z}{\partial z}\right) = -\frac{\partial P}{\partial z} - \left(\frac{1}{r}\frac{\partial}{\partial r}(r\tau_{rz}) + \frac{1}{r}\frac{\partial \tau_{\theta z}}{\partial \theta} + \frac{\partial \tau_{zz}}{\partial z}\right) + \rho g_z$$

Considering that the process occurs fundamentally in the vertical direction, the velocity of the fluid around the vertical direction ($v_\theta$) may be assumed to be zero. That is, while it is possible to rotate the end mold 30 to cause the velocity $v_\theta$ to be non-zero, for purposes of the balance described herein, it will be assumed that the end mold 30 is not rotated. Because the velocity around the vertical direction is assumed to be zero, the second equation becomes zero, and the first and third equations are the equations of interest.

In regarding to the first and third equations, it will be recognized that the right-hand side of the first and third equations include terms relating to the speed of the material in the radial and vertical directions, as well as partial differentials of the speed in the radial and vertical directions with respect to time and with respect to the radial and vertical directions.

Furthermore, it will be recognized that the left-hand side of the first and third equations include terms related to pressure (P) and viscosity ($\sigma$).

As relates to the pressure, in contrast with traditional extrusion machinery and processes, the structure and operation of the molding apparatus according to embodiments of the present disclosure permits the pressure gradient ∂P/∂z to vary, reflected in a variation in the flow rate of molding material passing through the mold. In a similar fashion, the molding apparatus according to embodiments of the present disclosure permits the pressure gradient ∂P/∂r to vary, reflected in a variation in the force directed outwardly against the wall of the molded product 20a.

As relates to those terms related to viscosity, it will be recognized that the viscosity terms are dependent upon the material in question. In particular, they represent a constitutive relation in that they are dependent upon the external forces applied to the material, such as the pressure gradients for the molded material and the fluid (air) exiting the core 2, gravity, and the downward force applied to the tubular section of the molded product 20a via the end mold 30.

The process 200 thus represents a balance between pressure/flow rate, speed and the constitutive relations. For example, it the pressure gradients ∂P/∂z and ∂P/∂r are equal to zero (related to a constant flow rate and a constant fluid pressure), then a molded product 20a with constant inner and outer diameters may be produced by maintaining a constant speed for the end mold 30. On the other hand, if the pressure gradients are equal to zero and the end mold 30 is accelerated away from the outer mold 2/mold core 2, a tapered tube is produced.

It will be recognized that other actions may be performed as part of the process 200 beyond those illustrated in FIGS. 14-17 (which are fundamentally related to the aforementioned balance of speed and flow rates). For example, the process 200 may include heating the outer mold 1 and the mold core 2 throughout the process, as explained above. In addition, the process 200 may include coupling a vacuum pump to the cavity 3 after the mold is disposed in its initial positon at block 202 before injecting molding material into the cavity 3 at block 204. The pump is activated to remove air from the cavity 3 and facilitate polymer flow into the cavity, and once a desired vacuum is developed (e.g., 20% atmospheric pressure) the molding material is injected. During this action, the valve 105 would be closed to decouple the fluid (air) source 104 from the cavity 3.

In addition, it will be recognized that one or more controllers 108 may be provided, as illustrated in FIG. 1. The controller(s) 108 may be coupled (via couplings A, B, C, D, and E) to the metering device 101, the actuators 103, 106, 107, and/or the valve 105 to control the metering device 101, the actuators 103, 106, 107 and/or the valve 105 according to the process 200 described above. For example, the controller(s) 108 may vary the rate at which molding material is provided to the inlet 5 by varying the operation of the metering device 101, the speed of the end mold 30 by varying the operation of the actuator 103, and the rate of fluid supplied to the core 8 by varying the operation of the valve 105. While the controller(s) 108 is illustrated as coupled directly to the metering device 101, the actuators 103, 106, 107, and the valve 105, additional equipment (e.g., drives) may be disposed between the controller(s) 108 and the metering device 101, actuator 103, and/or valve 105.

According to certain embodiments, the controller(s) 108 may include electrical circuit components and/or one or more uniquely programmed processors. In those embodiments wherein a uniquely programmed processor is included, the instructions by which the processor is programmed may be stored on a memory associated with the processor. The memory may include one or more tangible non-transitory computer readable memories, having computer executable instructions stored thereon, which when executed by the processor, may cause the one or more processors to carry out one or more actions. The controller(s) 108 may be programmed to control one or more of the metering device 101, the actuator(s) 103, 106, 107 and the valve 105, such as to carry out a process according to any of the embodiments discussed herein for example.

EXAMPLES

The following examples were performed using an Arburg 270S S350-70 injection-molding machine modified according to the embodiments of the present disclosure.

The molding apparatus included a one-piece end mold capable of producing a Nelaton tip, mounted on a sledge movable in the vertical direction. The sledge was coupled to a controller capable of starting and stopping the sledge, as well as controlling the speed of the sledge at different stages of the process. The machine also included an elongated core connected to an air source via an air valve. The air valve was coupled to an air flow meter capable of opening and closing the air valve, as well as controlling the airflow rate at different stages of the process. The machine also included cooling inserts movable about the catheter once the sledge reached a specific position. The inserts were attached to actuators coupled to a controller capable of starting and stopping the actuators so that the cooling inserts were moved between a first position where the inserts were spaced from the catheter and a second position where the inserts were about the catheter.

The molding material used was Teknorapex Medalist MD585 thermoplastic elastomer (TPE) resin, at a temperature of 170° C. and a pressure not exceeding 550 bar.

The bending stiffness was used as a characteristic of the catheters for comparison purposes. The bending stiffness of the catheter was obtained from force versus displacement curves measured in duplicate at room temperature with an Instron 5543 tensile testing apparatus operated a 4.27 mm/min, a 10 N load cell, and the 3-point bending configuration with the load applied at the midpoint between two supports separated 7.5 cm apart. A pre-load of 0.02 N was applied to the midpoint, and the pre-load was zeroed prior to collecting the force versus displacement curve data. The bending stiffness was obtained from the secant point at 2 mm displacement and the origin of the curve.

Example 1

A straight catheter tube 40 cm long was produced with the following process parameters:

| Position # | 1 | 2 | 3 | 4 | 5 | 6 | 7 | 8 | 9 | 10 |
|---|---|---|---|---|---|---|---|---|---|---|
| Mold end position from die [mm] | 0 | 9 | 67 | 117 | 167 | 257 | 287 | 287 | 389 | 400 |
| Polymer flow rate [cm³/s] | 2.2 | 2.2 | 3.0 | 0.8 | 0.8 | 0.8 | 0.8 | 0.8 | 0.8 | 0 |
| Sledge speed [mm/s] | 0 | 25 | 25 | 30 | 35 | 35 | 35 | 40 | 40 | 0 |
| Air flow [L/min] | 0 | 0.6 | 0.6 | 0.6 | 0.6 | 0.6 | 0.6 | 0.6 | 0.6 | 0.6 |

The bending stiffness was measured at different positions along the length of the catheter and the results are shown below:

| | Distance from the catheter tip [mm] | | | |
|---|---|---|---|---|
| | 50 | 150 | 250 | 350 |
| Bending stiffness [N/mm] | 0.15 ± 0.02 | 0.15 ± 0.02 | 0.15 ± 0.02 | 0.15 ± 0.02 |
| Outer diameter [mm] | 5.6 ± 0.2 | 5.6 ± 0.2 | 5.6 ± 0.2 | 5.6 ± 0.2 |
| Inner diameter [mm] | 5.0 ± 0.1 | 5.0 ± 0.1 | 5.0 ± 0.1 | 5.0 ± 0.1 |

As will be recognized, the variations in tip mold/sledge speed, polymer flow rate, and airflow rate produced a catheter having a uniform (constant) inner and outer diameter, and a uniform (constant) bending stiffness.

Example 2

A straight catheter tube 40 cm long with a narrow tip was produced with the following process parameters:

| Position # | 1 | 2 | 3 | 4 | 5 | 6 | 7 | 8 | 9 | 10 |
|---|---|---|---|---|---|---|---|---|---|---|
| Mold end position from die [mm] | 0 | 3 | 9 | 117 | 167 | 257 | 287 | 287 | 389 | 400 |
| Polymer flow rate [cm³/s] | 2.2 | 2.2 | 3.0 | 0.8 | 0.8 | 0.8 | 0.8 | 0.8 | 0.8 | 0 |
| Sledge speed [mm/s] | 0 | 25 | 25 | 30 | 35 | 35 | 35 | 40 | 40 | 0 |
| Air flow [L/min] | 0 | 0.0 | 0.6 | 0.6 | 0.6 | 0.6 | 0.6 | 0.6 | 0.6 | 0.6 |

The bending stiffness was measured at different positions along the length of the catheter and the results are shown below.

| | Distance from the catheter tip [mm] | | | |
|---|---|---|---|---|
| | 50 | 150 | 250 | 350 |
| Bending stiffness [N/mm] | N/A* | 0.15 ± 0.02 | 0.15 ± 0.02 | 0.15 ± 0.02 |
| Outer diameter [mm] | <2 mm | 5.6 ± 0.2 | 5.6 ± 0.2 | 5.6 ± 0.2 |
| Inner diameter [mm] | <2 mm | 5.0 ± 0.1 | 5.0 ± 0.1 | 5.0 ± 0.1 |

As will be recognized, the variations in end mold/sledge speed, polymer flow rate, and air flow rate (with a delay in air flow rate after initiating motion of the end mold) produced a catheter having a uniform (constant) inner and outer diameter and a uniform (constant) bending stiffness outside a region adjacent the tip. Inside the region, the inner and outer diameters were significantly smaller that outside the region and the stiffness was too small to measure using the equipment and process described above.

Example 3

A variable stiffness partially tapered catheter tube 40 cm was produced with the process parameters shown in the table below.

| Position # | 1 | 2 | 3 | 4 | 5 | 6 | 7 | 8 | 9 | 10 |
|---|---|---|---|---|---|---|---|---|---|---|
| End mold position from die [mm] | 0 | 9 | 67 | 117 | 167 | 257 | 287 | 287 | 389 | 400 |
| Polymer flow rate [cm$^3$/s] | 2.2 | 2.2 | 3.0 | 0.8 | 0.8 | 0.8 | 0.8 | 0.8 | 0.8 | 0 |
| Sledge speed [mm/s] | 0 | 25 | 25 | 30 | 35 | 35 | 35 | 50 | 50 | 0 |
| Airflow [L/min] | 0 | 0.6 | 0.6 | 0.6 | 0.6 | 0.6 | 0.6 | 0.6 | 0.6 | 0.6 |

The bending stiffness was measured at different positions along the length of the catheter and the results are shown below.

| | Distance from the catheter tip [mm] | | | |
|---|---|---|---|---|
| | 50 | 150 | 250 | 350 |
| Bending stiffness [N/mm] | 0.03 ± 0.01 | 0.12 ± 0.01 | 0.15 ± 0.01 | 0.16 ± 0.01 |
| Outer diameter [mm] | 2.80 ± 0.2 | 4.42 ± 0.2 | 5.38 ± 0.2 | 5.43 ± 0.2 |
| Inner diameter [mm] | 2.50 ± 0.1 | 3.5 ± 0.1 | 4.88 ± 0.1 | 5.00 ± 0.1 |

The process described above produced a catheter with an increasing inner diameter, outer diameter and bending stiffness (as measured from the catheter tip). Moreover, the structure produced does not have a constant taper angle along the catheter length. The taper angle changes along the catheter length, showing a sudden increase or transition in the region between 50 and 150 mm from the tip. Thereafter, the taper angle increases slowly. The taper almost disappears at the end opposite the tip, where the tube almost straight.

Example 4

A straight catheter tube 40 cm long with a blow molded funnel portion was produced with the following process parameters:

| Position # | 1 | 2 | 3 | 4 | 5 | 6 | 7 | 8 | 9 | 10 |
|---|---|---|---|---|---|---|---|---|---|---|
| Mold end position from die [mm] | 0 | 9 | 67 | 117 | 167 | 257 | 287 | 287 | 389 | 400 |
| Polymer flow rate [cm$^3$/s] | 2.2 | 2.2 | 3.0 | 0.8 | 0.8 | 0.8 | 0.8 | 0.8 | 0.8 | 0 |
| Sledge speed [mm/s] | 0 | 25 | 25 | 30 | 35 | 35 | 35 | 40 | 40 | 0 |
| Airflow [L/min] | 0 | 0.6 | 0.6 | 0.6 | 0.6 | 0.6 | 0.6 | 0.6 | 0.6 | 25 |

The bending stiffness was measured at different positions along the length of the catheter and the results are shown below:

| | Distance from the catheter tip [mm] | | | |
|---|---|---|---|---|
| | 50 | 150 | 250 | 350 |
| Bending stiffness [N/mm] | 0.15 ± 0.02 | 0.15 ± 0.02 | 0.15 ± 0.02 | 0.15 ± 0.02 |
| Outer diameter [mm] | 5.6 ± 0.2 | 5.6 ± 0.2 | 5.6 ± 0.2 | 5.6 ± 0.2 |
| Inner diameter [mm] | 5.0 ± 0.1 | 5.0 ± 0.1 | 5.0 ± 0.1 | 5.0 ± 0.1 |

Unlike the previous examples, the cooling mold blocks according to this example had an end section geometry that defined a funnel shape. The increase in the fluid flow rate at the final step of the process caused the molded article to be forced outwardly into contact with the end section geometry, producing a catheter with a proximal tip and a distal, funnel-shaped connecter end thereby.

In the alternative to the illustrated embodiments of FIGS. 1-13, it will be recognized that the disclosure may also be used for the formation of profiles, such as tubes with multiple layers, for example a bi-layer, tri-layer tubes, etc. This may be achieved by providing more than one inlet member. As one further example, FIGS. 18 and 19 illustrate an embodiment wherein the end mold 30 is used to form the connector end of a catheter, instead of the tip of the catheter.

The molding apparatus includes a stationary outer mold 1 and a stationary elongated mold core 2, which mold 1 and core 2 define a tubular cavity 3 therebetween. An inlet 5 may be provided to receive molding material 20, such as a thermoplastic elastomer for example. The elongated mold core 2 is provided with an end section so that the extent of the cavity 3 is limited at the inlet 5 but extends beyond the outer mold 1 and into an end mold 30, and in particular an end cavity 42.

As is illustrated in FIG. 18, the tubular cavity 3 and the end cavity 42 are aligned and the end of the elongated mold core 2 may extend slightly into the end cavity 42. As the cavity 3 (including the end cavity 42) is filled, the end mold 30 starts moving. It should be noted, that the filling of the end cavity 42 in this context does not necessarily require the filing of the complete end cavity 42: according to certain embodiments, the end cavity may be partially filled or filled with a pre-formed or pre-molded connector end (or funnel) prior to the step of injecting molding material into the cavities 3, 42 so as to overmold the pre-molded part. As the end mold 30 starts moving, pressurized fluid may be supplied from a pressurized fluid source through a central axial fluid channel 9 in the elongated mold core 2 and into the internal volume 9b of the molded portion 20a of the product (see FIG. 19).

The end mold 30 is kept cool, i.e. well below the melting temperature of the polymer molding material 20. The pressurized air supplied to the inside of the product formed stabilizes the molded portion 20a of the tubular product that is in the process of being molded. As the required length of the tubular product is about to be reached, a set of cooling mold blocks 43, 44 (see FIG. 19) are provided around the tubular molded portion 20a to cool the product. The cooling mold blocks 43, 44 may include a cooling system 8 (e.g., a coolant circuit including one or more passages for the movement of a coolant, such as water).

It will be recognized that the mold blocks 43, 44 may be used to add a predetermined pattern on the catheter surface. Further, the mold blocks 43, 44 may have a surface that defines the tip end of the catheter 20a with the cooling blocks 43, 44 clamped around the molded product 20, as shown in FIG. 19.

In keeping with the foregoing, the molding of a funnel portion (connector end) of a catheter may be followed by extrusion of a tubular portion, with the catheter tip being formed using cooling blocks or inserts. Further, according another embodiment, a pre-formed or pre-molded funnel may be mounted or disposed within the end mold and a tube portion may be overmolded onto the pre-molded funnel, again with the catheter tip being formed using the cooling blocks or inserts.

As a further example of an alternative embodiment for the equipment described above, FIGS. 20 and 21 illustrate an embodiment wherein a valve is included to prevent the (back)flow of molding material into the axial fluid channel, thereby limiting the number of articles that may be produced. While the embodiment of FIGS. 20 and 21 includes an end mold 30 that may be used to form the connector end (or funnel) of a catheter, as opposed to the tip of the catheter, there is nothing herein that limits the embodiment as such. In fact, the embodiment of FIGS. 20 and 21 may be used in conjunction with the mold and mold core that are used to form a tip, such as are illustrated in FIGS. 1-13, as well.

Similar then to the embodiments in FIGS. 1-13 and 18-19, the molding apparatus includes a stationary outer mold 1 and a stationary elongated mold core 2, which mold 1 and core 2 define a tubular cavity 3 therebetween. An inlet 5 may be provided to receive molding material, such as a thermoplastic elastomer for example. The elongated mold core 2 is provided with an end section so that the extent of the cavity 3 is limited at the inlet 5 but extends beyond the outer mold 1 and into an end mold 30, and in particular an end cavity 42.

Figure 20:
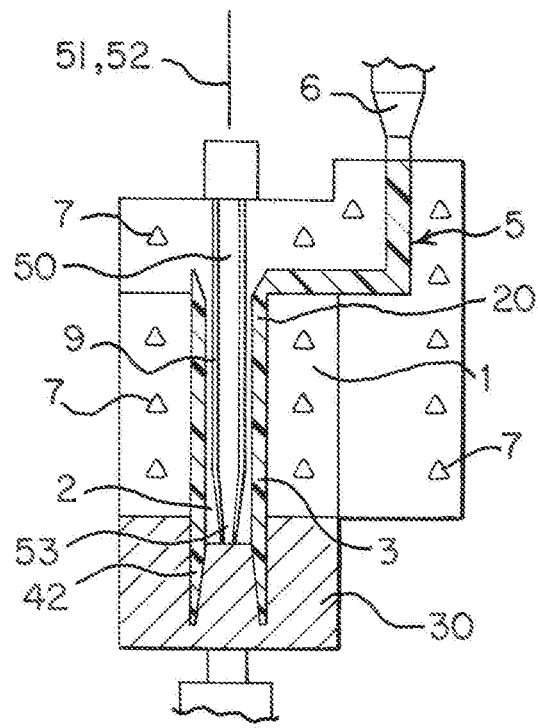
FIG. 20 is a schematics cross-sectional view of another alternative embodiment of a molding apparatus is a first stage.

As is illustrated in FIG. 20, the tubular cavity 3 and the end cavity 42 are aligned and the end of the elongated mold core 2 may extend slightly into the end cavity 42. As the cavity 3 (including the end cavity 42) is filled, the end mold 30 starts moving. As the end mold starts moving, pressurized fluid may be supplied from a pressurized fluid source through a central axial fluid channel 9 in the elongated mold core 2 and into the internal volume 9b of the molded portion 20a of the product (see FIG. 21).

However, it is believed that despite the flow of pressurized fluid from a pressurized fluid source through the fluid channel 9, molding material 20 may move into the fluid channel 9 (or backflow) either before or as the end mold 30 begins to move relative to the stationary mold 1 and mold core 2. It is believed that the molding material 20 may have a tendency to enter the fluid channel 9 as a consequence of the pressure applied to the molding material 20 to make the molding material to move through the cavity 3 and into the end cavity 42.

Over time, the entry of the molding material 20 into the fluid channel 9 may cause the fluid channel 9 to become obstructed, which obstruction may limit or even prevent the flow of fluid through the fluid channel 9 into the internal volume 9b of the molded portion 20a of the product. If this occurs, then it may be necessary to interrupt production of the product to remove the obstruction from the fluid channel 9. The obstruction thus may have consequences not only on the number of individual instances of the product that may be made between such interruptions, but may influence the smooth operation of downstream manufacturing, assembly and packaging process as well as the cost of the product (because the need for frequent servicing of the manufacturing equipment).

Therefore, a valve may be disposed in the fluid channel 9 to prevent the movement of material from the cavities 3, 42 and into the fluid channel 9. In particular, the valve includes a mandrel 50 that may define the valve stem, head and face. The mandrel 50 is disposed in the fluid channel 9 so as to be moveable relative to the fluid channel 9, which defines the valve seat. As illustrated, the fluid channel 9 has a longitudinal axis 51 and the mandrel 50 has a longitudinal axis 52, with the longitudinal axis 51 collinear with the longitudinal axis 52. According to other embodiments, the two axes 51, 52 need not be collinear.

The mandrel 50 may have a tapered section 53 disposed at an end 54 of the mandrel 50. In a similar fashion, the fluid channel 9 may have a tapered inner surface 54, the tapered inner surface 54 cooperating with the tapered section 53 (and in particular the surface of the tapered section 53). According to certain embodiments, the surface of the tapered section 53 and the tapered inner surface 54 may abut to form a seal between the mandrel and the fluid channel 9. This seal may not be entirely fluid-tight, but may present a significant obstacle to the movement of molding material 20 into the fluid channel 9. According to other embodiments, the mandrel 50 may simply be received with the opening in the end of the fluid channel 9 to limit the movement (backflow) of molding material 20 into the fluid channel 9; according to such an embodiment, the mandrel 50 may extend through and out of the opening to further ensure a seal with the opening.

Figure 21:
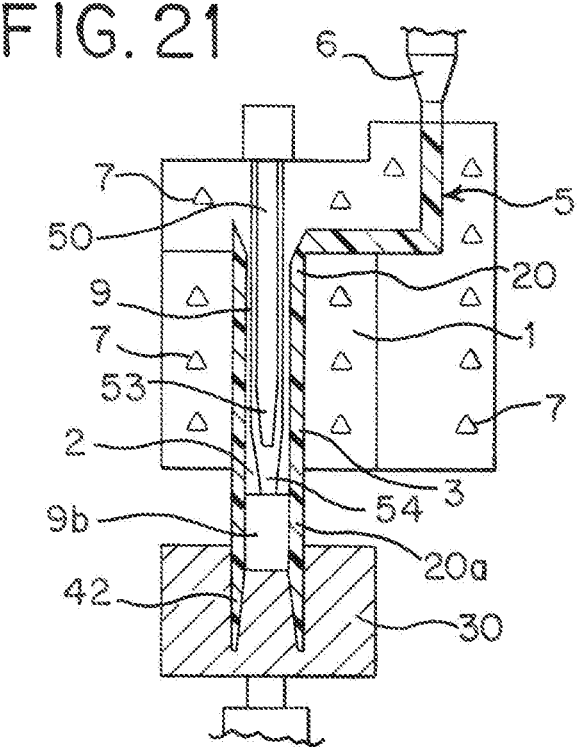
FIG. 21 is a schematic cross-sectional view of the embodiment of the molding apparatus of FIG. 20 in a second stage.

The mandrel 50 is moveable along its longitudinal axis 52 to open and close the opening in the core 2 that is in fluid communication with the fluid channel 9. Thus, FIG. 20 illustrates the mandrel 50 in a first stage, state or position, wherein the mandrel 20 is received within the fluid channel 9 to limit movement of molding material 20 into the fluid channel 9. This may be referred to as the closed stage, state or position. FIG. 21 illustrates the mandrel 50 in a second stage, state or position, wherein the mandrel 20 is withdrawn along the longitudinal axis 52 so that fluid may move along the fluid channel 9 and out of the opening in the core 2. This may be referred to as the open stage, state or positon. It will be recognized that it may be possible for some amount of molding material 20 to enter the channel 9 in the closed state, and the presence of the mandrel 50 may obstruct some flow of the fluid in the channel in the open state. It may be possible to define a state where no molding material enters the channel (i.e., a fully closed state), and a state where the mandrel 50 does not obstruct flow through the opening (i.e., a fully open state).

In operation, the movement of the mandrel 50 may be synchronized with the movement of the end mold 30 and the operation of the fluid source 104. That is, the mandrel 50 will be retained in its closed state (or fully closed state) at least until the end mold 30 begins to move. The movement of the mandrel 50 from its closed state (or fully closed state) to an open state (or fully open state) may be delayed, as explained above, until the end mold 30 has moved or traveled a particular distance from the mold 1 and core 2. Alternatively, the movement of the mandrel 50 from its closed state (or fully closed state) to an open state (or fully open state) may occur simultaneously (or substantially simultaneously) with the movement of the end mold 30. In this regard, the mandrel 50 may operate as the valve 105 discussed above, or the mandrel 50 (and the valve defined thereby) may function in conjunction with a separate structure that defines the valve 105.

By disposing the mandrel 50 at least in the fluid channel 9 while the molding material is entering the cavities 3, 42, the mandrel 50 may limit the movement of the pressurized molding material into the fluid channel 9. As discussed above, the mandrel 50 may extend through the opening in the core 2 at the end of the fluid channel 9 to limit movement of molding material through the opening. In addition, based on the structure of the mandrel 50, the fluid channel 9 and the opening in the core 2, the mandrel 50 (or more generally, the valve defined by the mandrel 50) may prevent movement of the pressurized molding material into the fluid channel 9 and (optionally) the opening in the core 2.

As a consequence of the mandrel 50/valve limiting the amount of molding material entering the fluid channel 9, the formation of an obstruction within the fluid channel 9 may be limited, or even prevented. This can decrease the number of interruptions required to remove material from the fluid channel 9, and thus increase the number of individual instances of the product (e.g., catheter) that are produced between maintenance sessions and decrease the cost of maintenance and the product.

In conclusion, although the preceding text sets forth a detailed description of different embodiments of the invention, it should be understood that the legal scope of the invention is defined by the words of the claims set forth at the end of this patent. The detailed description is to be construed as exemplary only (i.e., providing only examples) and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term 'X' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted as a "means-plus-function" limitation.

Other Aspects

Aspect 1. A method of injection molding of an elongated hollow article, said method comprising the steps of: injecting a molding material at a material flow rate into a mold comprising a stationary outer mold with a substantially tubular mold cavity, a moveable end mold with an end mold cavity aligned with the tubular mold cavity, and a stationary elongated mold core with a fluid channel therethrough, the mold core extending through the tubular cavity into the end mold cavity; moving the end mold at a speed in a linear direction from a first position with the end mold cavity aligned with the central mold cavity to a second position at a predetermined distance between the end mold and the outer mold; supplying a fluid at a fluid flow rate to the fluid channel in the elongated mold core; and varying at least one of the material flow rate, the end mold speed and the fluid flow rate as the end mold moves from the first position to the second position.

Aspect 2. The method according to aspect 1, wherein the varying step comprises balancing the material flow rate, the end mold speed and the fluid flow rate.

Aspect 3. The method according to aspect 1, wherein the varying step comprises increasing the material flow rate after the end mold begins moving, and decreasing subsequently the material flow rate before the end mold reaches the second position.

Aspect 4. The method according to aspect 3, wherein the varying step comprises increasing the material flow rate immediately after the end mold begins moving, and decreasing subsequently the material flow rate before the end mold reaches the second position.

Aspect 5. The method according to aspect 1, wherein the varying step comprises progressively increasing the end mold speed as the end mold moves between the first position and the second position.

Aspect 6. The method according to aspect 5, wherein the varying step comprises progressively increasing the end mold speed as the end moves between the first positions and a third position between the first and second positions, and substantially increasing the end mold speed as the end moves between the third and second positions.

Aspect 7. The method according to aspect 1, wherein the supplying step occurs simultaneously with the moving step.

Aspect 8. The method according to aspect 1, wherein the supplying step is delayed relative to the moving step.

Aspect 9. The method according to aspect 1, wherein the varying step comprises increasing the fluid flow rate immediately before the end mold reaches the second positon.

Aspect 10. The method according to aspect 1, further comprising the step of cooling the hollow article when the end mold part has reached the second position.

Aspect 11. The method according to aspect 10, whereby the cooling is performed by a set of cooling mold blocks that are provided for encompassing the molded portion of the article by radially inward movement.

Aspect 12. The method according to aspect 11, wherein the cooling mold blocks are provided with inner contacting surfaces resembling the shape of the tubular mold cavity and wherein the cooling molding blocks are formed with end contacting surfaces having an end section geometry and pressurized air is supplied to form said end section geometry.

Aspect 13. The method according to any of aspects 10 to 12, whereby the molded article is cut away from the mold by a cuter provided in a gap between the cooling blocks and the outer mold with the end mold at the second position.

Aspect 14. A method according to any of the preceding aspects, the predetermined distance is selected to produce the hollow article in a desired length.

Aspect 15. A method according to any of the preceding aspects, including controlling the temperature of the outer mold to maintain a temperature at which the molding material is liquidized.

Aspect 16. A method according to aspect 15, including controlling the temperature of the elongated central mold core to maintain a temperature similar to that of the outer mold.

Aspect 17. A method according to aspect 15 or 16, including controlling the temperature of the movable end mold to maintain a temperature lower than that of the outer mold.

Aspect 18. A molding apparatus for an elongated hollow article, the apparatus comprising: a mold comprising a stationary outer mold with a substantially tubular cavity formed therein, a moveable end mold with an end mold cavity alignable with the tubular mold cavity, and a stationary elongated mold core with a fluid channel therethrough, the mold core extending through the tubular cavity into an end mold cavity of an end mold part; a molding material metering device coupled to the substantially tubular cavity to control the supply of a molding material to the substantially tubular cavity; an actuator coupled to the end mold to move the end mold from a first position with the end mold cavity aligned with the central mold cavity to a second positon at a predetermined distance between the end mold and the outer mold; and a valve coupled to the fluid channel to control the supply of a fluid to the fluid channel, wherein the molding apparatus is configured to vary a material flow rate of the molding material via the metering device, to vary a speed of the end mold via the actuator or to vary a fluid flow rate of the fluid via the valve as the end mold moves between the first positon and the second position.

Aspect 19. The molding apparatus according to aspect 18, wherein the molding apparatus is configured to balance the material flow rate, the end mold speed and the fluid flow rate as the end mold moves between the first positon and the second position.

Aspect 20. The molding apparatus according to aspect 18, wherein the molding apparatus is configured to increase the material flow rate after the end mold begins moving, and decrease subsequently the material flow rate before the end mold reaches the second position.

Aspect 21. The molding apparatus according to aspect 20, wherein the molding apparatus is configured to increase the material flow rate immediately after the end mold begins moving, and decrease subsequently the material flow rate before the end mold reaches the second position.

Aspect 22. The molding apparatus according to aspect 18, wherein the molding apparatus is configured to progressively increase the end mold speed as the end mold moves between the first position and the second position.

Aspect 23. The molding apparatus according to aspect 22, wherein the molding apparatus is configured to progressively increase the end mold speed as the end moves between the first positions and a third position between the first and second positions, and to substantially increase the end mold speed as the end moves between the third and second positions.

Aspect 24. The molding apparatus according to aspect 18, the molding apparatus is configured to increase a fluid flow rate of the fluid via the valve simultaneously as the end mold moves between the first positon and the second position.

Aspect 25. The molding apparatus according to aspect 18, wherein the molding apparatus is configured to increase a fluid flow rate of the fluid via the valve after the end mold begins to move between the first positon and the second position.

Aspect 26. The molding apparatus according to aspect 18, wherein the molding apparatus is configured to increase the fluid flow rate immediately before the end mold reaches the second positon.

Aspect 27. The molding apparatus according to aspect 18, wherein the molding apparatus is configured to cool the hollow article when the end mold part has reached the second position.

Aspect 28. The molding apparatus according to aspect 27, further comprising a set of cooling mold blocks, and wherein the molding apparatus is configured to move the cooling mold blocks radially inward to encompass the molded portion of the hollow article.

Aspect 29. The molding apparatus according to aspect 28, wherein the cooling mold blocks comprise inner contacting surfaces resembling the shape of the tubular mold cavity and end contacting surfaces having an end section geometry, and the molding apparatus is configured to supply fluid to the core to form said end section geometry.

Aspect 30. The molding apparatus according to any of aspects 27 to 29, further comprising a cuter provided in a gap between the cooling blocks and the outer mold with the end mold at the second position.

Aspect 31. The molding apparatus according to any of aspects 18 to 30, the predetermined distance is selected to produce the hollow article in a desired length.

Aspect 32. The molding apparatus according to any of aspects 18 to 31, wherein the molding apparatus is configured to control the temperature of the outer mold to maintain a temperature at which the molding material is liquidized.

Aspect 33. The molding apparatus according to aspect 32, wherein the molding apparatus is configured to control the temperature of the elongated central mold core to maintain a temperature similar to that of the outer mold.

Aspect 34. The molding apparatus according to aspect 32 or 33, wherein the molding apparatus is configured to control the temperature of the movable end mold to maintain a temperature lower than that of the outer mold.

Aspect 35. The molding apparatus according to any one of aspects 18 to 34, further comprising one or more controllers coupled to one or more of the metering device, the actuator and the valve, the one or more controllers configured to control the one or more of the metering device, the actuator and the valve.

Aspect 36. The molding apparatus according to aspect 35, wherein the one or more controllers each comprise one or more processors programmed to control the one or more of the metering device, the actuator and the valve.

Aspect 37. The molding apparatus according to aspect 35, wherein the valve also limits backflow of molding material into the fluid channel.

What is claimed is:

1. A method of injection molding of an elongated hollow article, said method comprising the steps of:
    injecting a molding material at a material flow rate into a mold comprising a stationary outer mold with a substantially tubular mold cavity, a moveable end mold with an end mold cavity aligned with the tubular mold cavity, and a stationary elongated mold core with a fluid channel therethrough, the mold core extending through the tubular cavity into the end mold cavity;
    moving the end mold at a speed in a linear direction from a first position with the end mold cavity aligned with the central mold cavity to a second position at a predetermined distance between the end mold and the outer mold;
    supplying a fluid at a fluid flow rate to the fluid channel in the elongated mold core; and
    varying selectively, via one or more controllers, at least one of the material flow rate, the end mold speed and the fluid flow rate at one or more points as the end mold moves between the first position and the second position, the one or more controllers configured to control one or more of a metering device configured to inject the molding material, an actuator configured to move the end mold, and a valve configured to supply the fluid to vary selectively the at least one of the material flow rate, the end mold speed, and the fluid flow rate at the one of more points as the end mold moves between the first position and the second position.

2. The method according to claim 1, wherein the varying step comprises balancing the material flow rate, the end mold speed and the fluid flow rate.

3. The method according to claim 1, wherein the varying step comprises increasing the material flow rate after the end mold begins moving, and decreasing subsequently the material flow rate before the end mold reaches the second position.

4. The method according to claim 3, wherein the varying step comprises increasing the material flow rate immediately after the end mold begins moving, and decreasing subsequently the material flow rate before the end mold reaches the second position.

5. The method according to claim 1, wherein the varying step comprises progressively increasing the end mold speed as the end mold moves between the first position and the second position.

6. The method according to claim 5, wherein the varying step comprises progressively increasing the end mold speed as the end mold moves between the first position and a third position between the first and second positions, and substantially increasing the end mold speed as the end mold moves between the third and second positions.

7. The method according to claim 1, wherein the supplying step occurs simultaneously with the moving step.

8. The method according to claim 1, wherein the supplying step is delayed relative to the moving step.

9. The method according to claim 1, wherein the varying step comprises increasing the fluid flow rate immediately before the end mold reaches the second position.

* * * * *